(12) United States Patent
Murata et al.

(10) Patent No.: US 8,266,621 B2
(45) Date of Patent: Sep. 11, 2012

(54) INFORMATION PROCESSING METHOD, INFORMATION PROCESSING APPARATUS, AND SERVER

(75) Inventors: Kenichi Murata, Tokyo (JP); Tsutomu Horikawa, Kamagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1128 days.

(21) Appl. No.: 11/909,196

(22) PCT Filed: Apr. 6, 2006

(86) PCT No.: PCT/JP2006/307323
§ 371 (c)(1),
(2), (4) Date: Oct. 23, 2007

(87) PCT Pub. No.: WO2006/126331
PCT Pub. Date: Nov. 30, 2006

(65) Prior Publication Data
US 2008/0163228 A1 Jul. 3, 2008

(30) Foreign Application Priority Data
May 27, 2005 (JP) .................................. 2005-155945

(51) Int. Cl.
*G06F 9/46* (2006.01)

(52) U.S. Cl. ...................................... 718/102; 718/107

(58) Field of Classification Search .................. 718/102, 718/107
See application file for complete search history.

(56) References Cited

U.S. PATENT DOCUMENTS

| 5,752,030 A * | 5/1998 | Konno et al. .................. 718/102 |
| 6,453,376 B1 * | 9/2002 | Fairman et al. ............... 709/224 |
| 2003/0084144 A1 * | 5/2003 | Lipinski ........................ 709/224 |

FOREIGN PATENT DOCUMENTS

| JP | 06-059906 | 3/1994 |
| JP | 08-212084 | 8/1996 |
| JP | 11-249915 | 9/1999 |
| JP | 2001-022597 | 1/2001 |
| JP | 2001022597 A * | 1/2001 |
| JP | 2001-331324 | 11/2001 |

OTHER PUBLICATIONS

Notification of Refusal for Japanese Application JP 2005-155945 dated Jul. 1, 2008.
International Search Report for International application PCT/JP2006/307323.
International Preliminary Report on Patentability and Written Opinion for International application PCT/JP2006/307323.

* cited by examiner

Primary Examiner — Li Zhen
Assistant Examiner — Bradford Wheaton
(74) Attorney, Agent, or Firm — Matthew B. Dernier, Esq.; Gibson & Dernier LLP

(57) ABSTRACT

In an information processing system, when a request for execution of a new task is accepted, one or more of the required processing time and bus bandwidth for the new task are identified. A total required processing time, which is a sum of processing times required for the new task and a task reserved on a scheduler for indicating a procedure pertaining to a plurality of tasks, is compared with a processing time available in an apparatus executing those tasks. Similarly, a total required bus bandwidth, which is a sum of bus bandwidths required for processing the reserved task and the new task, is compared with a bus bandwidth available in the apparatus. Based on the result of the comparisons, it is determined whether the new task is executable.

18 Claims, 17 Drawing Sheets

| ATTRIBUTE NAME | REQUIRED VALUE |
|---|---|
| PROCESSING TIME | 1.6 ms |

70

FIG. 10
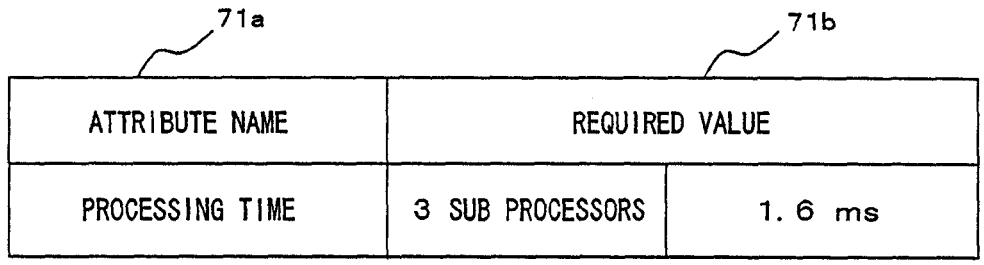
| ATTRIBUTE NAME | REQUIRED VALUE | |
|---|---|---|
| PROCESSING TIME | 3 SUB PROCESSORS | 1.6 ms |
71
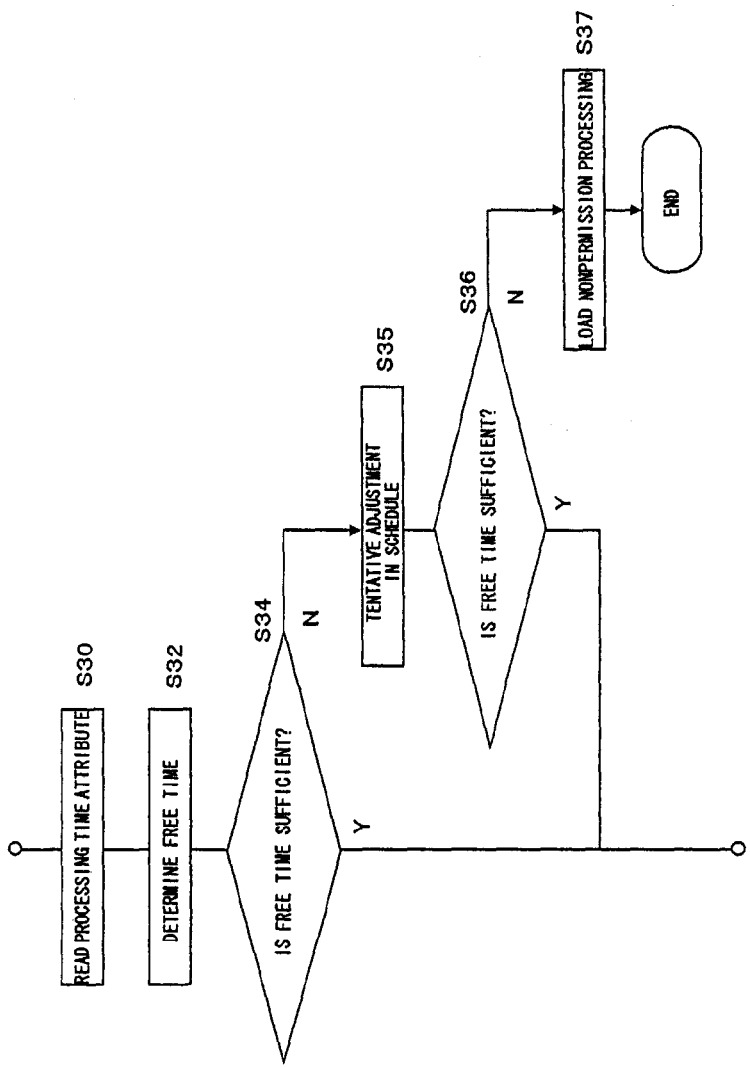
FIG. 11

FIG. 12

| ATTRIBUTE NAME | REQUIRED VALUE | | IDENTIFIER |
|---|---|---|---|
| PROCESSING TIME | 3 SUB PROCESSORS | 1.6 ms | — |
| BUS BANDWIDTH | 10 % | | mem |
| | 20 % | | gra |
| | 5 % | | io |

| ATTRIBUTE NAME | REQUIRED VALUE | |
|---|---|---|
| | 74a | 74b |
| PROCESSING TIME | 3 SUB PROCESSORS | 1.6 ms |
| PRIORITY | 4 | |

| ATTRIBUTE NAME | FIRST REQUIRED VALUE | | SECOND REQUIRED VALUE | IDENTIFIER |
| --- | --- | --- | --- | --- |
| PROCESSING TIME | 3 SUB PROCESSORS | 1.6 ms | — | — |
| BUS BANDWIDTH | 10 % | | 8 % | mem |
| | 20 % | | 20 % | gra |
| | 5 % | | 1 % | io |
| PRIORITY | 4 | | — | — |

| SOFTWARE NAME | TASK NUMBER | OPTIMUM VALUE | MINIMUM VALUE | USED VALUE |
| --- | --- | --- | --- | --- |
| GAME AAA | 1 | 50 % | 40 % | 45 % |
| CALC BBB | 2 | 20 % | 5 % | 10 % |
| BROWSER CCC | 3 | 5 % | 1 % | 4 % |
| ... | ... | ... | ... | ... |

78a / 78b / 78c / 78d / 78e

78

INFORMATION PROCESSING METHOD, INFORMATION PROCESSING APPARATUS, AND SERVER

TECHNICAL FIELD

The present invention relates to information processing technology, and in particular to an information processing apparatus which controls a plurality of task processes with its operating system, an information processing method for that apparatus, and a server which supports that apparatus.

BACKGROUND TECHNOLOGY

With significant technical progress in recent years, computers capable of performing a plurality of functions including those for operation as a television set, running a computer game, displaying digital video, and processing e-mail in each single apparatus in parallel have been prevailing. One of the technical challenges essential to developing computers with such performance is a speedup in processing. Aside from improving the processing speeds of respective modules that constitute a computer, the speedup in processing can also be effected by making efficient use of quantitative and temporal resources which are supplied from those modules. For example, multiprocessor-based parallel processing may be performed to provide faster arithmetic processing. Functions to be used by such software as application software and utility software may be retained separately as components and loaded as needed to provide efficient processing.

Technical development of the foregoing components, the pieces of software themselves, and the basic software or operating systems (hereinafter, referred to as OSes) has been advancing day by day, and users are wanting to update to the latest versions of these in order to enhance the performance of their computers. Nevertheless, since software is typically effected by the cooperation of various pieces of software themselves and components, OSes, and apparatuses, separate updating can sometimes impair compatibility and cause problems during software operation. Consequently, Japanese Patent Laid Open Publication 2001-331324 discloses techniques in which files that describe version compatibility are added to the components so that compatibility is managed separately for efficient updating and compatibility problems are prevented from occurring (for example, see Patent Document 1).

Related art list JPA laid-open 2001-331324.

SUMMARY OF THE INVENTION

Parallel processing of a plurality of pieces of software has become feasible due to advances of the apparatuses themselves which become capable of parallel computing and by virtue of contrivances such as functional divisions as mentioned above. Such parallel processing requires that processors, memories, buses, and other resources included in a computer be shared among the plurality of pieces of software. For this reason, the greater the number of pieces of software to start is, the less the resources one piece of software can occupy and the lower the operation speed becomes because of processing waits and the like. The inventor has recognized, however, that some software can fail to operate adequately unless certain operating speed is guaranteed.

The present invention has been developed in view of the foregoing problems, and a general purpose thereof is to provide a technology for operating a plurality of pieces of software adequately and efficiently.

One embodiment of the present invention relates to an information processing method. This information processing method includes: accepting a request for execution of a new task; identifying at least either one of a processing time required for the new task and a bus bandwidth required for processing the new task; making at least either one of comparisons between a total required processing time, which is a sum of processing times required for the new task and a reserved task reserved on a scheduler for indicating a procedure pertaining to a plurality of tasks, and a processing time available in an apparatus that executes those tasks, and between a total required bus bandwidth, which is a sum of bus bandwidths required for the reserved task and the new task, and a bus bandwidth available in the apparatus that executes those tasks; determining whether the new task is executable or not, based on the result of comparison(s); making a reservation for the new task on the scheduler if the new task is determined to be executable; and processing the tasks including the new task which is determined to be executable based on the scheduler. In this instance, determining whether a new task is executable or not includes acquiring priority information on the new task, and whether the new task is executable or not is determined based on the priority information acquired.

The "tasks" refer to the contents of applications, or information processing included therein, that are programmed in order to achieve certain objects. They may correspond to applications or units smaller than applications such as input and output controls and user-specified commands, as long as they correspond to some processing or functional units.

Another embodiment of the present invention relates to an information processing apparatus. This information processing apparatus includes: a first processor which primarily exercises centralized control on the entire apparatus; a second processor which primarily performs arithmetic processing; a main memory which stores information on tasks to be processed; and a data input and output processor which controls input and output of data with an external device, the first processor including: an execution request accepting part which accepts a request for execution of a new task; a parameter identification part which identifies a time-related parameter pertaining to processing of the new task; an execution permission part which determines whether the new task is executable or not, based on the identified time-related parameter and corresponding internal information corresponding to the time-related parameter out of information pertaining to the interior of the information processing apparatus; and an activation processing part which activates processing of the new task if the new task is determined to be executable. The time-related parameter includes at least any one of: a bus bandwidth required for the new task when transmitting data between the first processor and the main memory; a bus bandwidth required for the new task when transmitting data between the first processor and the second processor; and a bus bandwidth required for the new task when transmitting data between the first processor and the data input and output processor.

It should be appreciated that any combinations of the foregoing components, and any conversions of expressions of the present invention from/into methods, apparatuses, systems, computer programs, and the like are also intended to constitute applicable embodiments of the present invention.

According to the present invention, it is possible to ensure adequate operations of a plurality of tasks with efficiency.

BRIEF DESCRIPTION OF THE DRAWINGS

FIG. 10 is a diagram showing an example of the data structure of an attribute file according to the second embodiment;

FIG. 11 is a flowchart showing a software loading procedure to be performed in the second embodiment;

FIG. 12 is a diagram showing an example of the data structure of an attribute file according to a third embodiment;

FIG. 14 is a diagram showing an example of the data structure of an attribute file according to a fourth embodiment;

FIG. 16 is a diagram showing an example of the data structure of an attribute file according to a fifth embodiment;

FIG. 17 is a diagram showing an example of the data structure of a bus bandwidth reservation file according to the fifth embodiment;

DESCRIPTION OF REFERENCE NUMERALS

Figure 1:
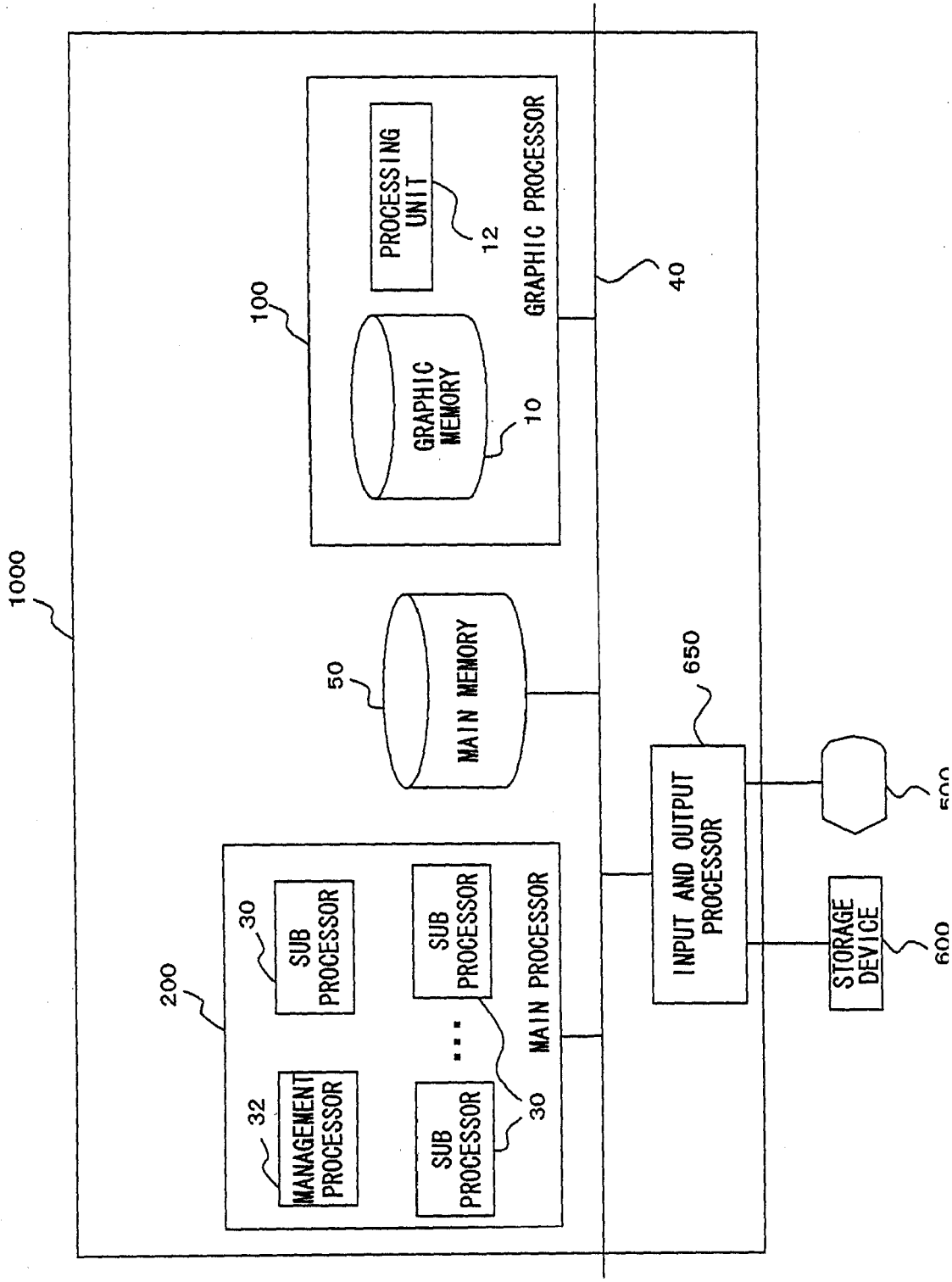
FIG. 1 is a block diagram showing the configuration of an information processing apparatus according to a first embodiment.

30 . . . sub processor, 32 . . . management processor, 40 . . . bus, 50 . . . main memory, 60 . . . load request accepting part 62 . . . attribute acquisition part, 64 . . . state acquisition part, 66 . . . determination part, 68 . . . activation processing part, 100 . . . graphic processor, 200 . . . main processor, 600 . . . storage device, 650 . . . input and output processor, 700 . . . server, 702 . . . server-side information processing part, 704 . . . server-side storage device, and 1000 . . . information processing apparatus.

BEST MODE FOR CARRYING OUT THE INVENTION

Overview of Embodiments

For an information processing apparatus which executes a plurality of pieces of software simultaneously, it is important to determine how to allocate such limited resources as the processing time of the processor and the bus bandwidth available for data transmission to the pieces of software. For example, when an apparatus having a plurality of pieces of software already running thereon activates a new piece of software, each of the pieces of software naturally slows down in operation if the processing time and the bus bandwidth are allocated evenly to all the pieces of software to be run. In some software including high-level real-time tasks such as graphic processing, adequate operation is not always guaranteed unless a certain minimum processing speed is available. In the present embodiments, the occupancy time of the processor (hereinafter, referred to as the processing time) and the bus bandwidth, which are essential to processing speed, are checked when activating a task. This suppresses both the occurrence of processing at an operating speed unexpected by users and the occurrence of problems, for both the task to be activated and tasks already activated. More specifically, the following processing will be performed.

1. Initially, when accepting a request for execution of new software, at least either one of a processing time and a bus bandwidth required for the corresponding task (hereinafter, referred to as new task) is identified. Those values have been written as a processing time attribute and a bus bandwidth attribute, respectively, to an attribute file which is attached to the source program of the new software, or acquired from a server over a network. In addition to this, the processing time or bus bandwidth required for tasks that are already activated (hereinafter, referred to as reserved tasks) is also identified. Those values are written task by task to a schedule file and a bus bandwidth reservation file which are stored in a main memory. Subsequently, at least either one of comparisons between the processing time required for the new task and the processor free time calculated from the processing time of the reserved tasks and between the bus bandwidth required for the new task and an available bus bandwidth calculated from the bus bandwidth used by the reserved tasks is performed to determine whether the new task is executable or not in view of at least either one of the processing time and the bus bandwidth. If the new task is determined to be executable, the schedule file and the bus bandwidth reservation file are updated, the new task is activated, and processing is performed based on the schedule file. Whether the new task may or may not be executable may depend on the priorities of the respective tasks. The priority of the new task has been attached to the source program or the like as a priority attribute. The priorities of the reserved tasks are written task by task in a priority file which is stored in the main memory or the like (First to eighth embodiments).

2. If the processing time required for the new task exceeds the processor free time, or if the required bus band width exceeds the available bus bandwidth, whether or not to stop any reserved task is also determined based on the priorities (Fourth and fifth embodiments).

3. If the bus bandwidth required for the new task exceeds the available bus bandwidth, the bus bandwidths to be used by the respective tasks are adjusted based on the priorities (Fifth embodiment).

4. If the new task is determined to be not executable, a task that has issued the request for the execution of the new task is notified of it (First to fifth embodiments).

5. If it is determined that the new task is not executable or any reserved task is to be stopped, a main processor for controlling the apparatus recognizes this and notifies the user of it (First to fifth embodiments).

First Embodiment

FIG. 1 is a block diagram showing the configuration of an information processing apparatus 1000 according to the present embodiment. The information processing apparatus 1000 includes a graphic processor 100, a main processor 200, an input and output processor 650, and a main memory 50, all of which are connected to each other via a bus 40. The input and output processor 650 is connected to a display unit 500 and a storage device 600.

In FIG. 1, the individual elements shown as functional blocks for performing various kinds of processing can be constituted, in terms of hardware, by CPUs, memories, and other LSIs. In terms of software, they can be achieved by programs and the like that are loaded on a memory and have a reservation management function. It will thus be understood by those skilled in the art that these functional blocks may be practiced in various forms including hardware alone, software alone, or a combination of these, and not limited to any one of them.

This information processing apparatus 1000 runs an OS which provides functions and an environment for making efficient use of the information processing apparatus 1000, and exercises centralized control over the entire apparatus. The OS operates the individual functional blocks of the information processing apparatus 1000, thereby executing a plurality of pieces of software.

The main processor 200 includes a plurality of sub processors 30 and a management processor 32. The management processor 32 divides tasks corresponding to the plurality of pieces of software temporally, allocates the same to the sub processors 30 in units of time slices, and writes these to a schedule file which is stored in the main memory 50. The management processor 32 also allocates the bandwidth of the bus 40 to the plurality of tasks based on a bus bandwidth reservation file, and controls the used bus bandwidth in cooperation with the hardware. The sub processors 30 process the tasks in parallel according to the schedule file.

The graphic processor 100 includes a graphic memory 10 and a processing unit 12. The processing unit 12 performs image processing pertaining to each of the tasks processed by the main processor 200. Generated images and pictures are temporarily stored in the graphic memory 10, and are output to the display unit 500 or the storage device 600 under control of the input and output processor 650.

The main memory 50 is a storage area to be used primarily by the main processor 200. This main memory 50 stores loaded software programs and data pertaining to the tasks corresponding to the pieces of software. The main memory 50 also contains the schedule file, the bus bandwidth reservation file, and a priority file pertaining to reserved tasks.

The display unit 500 outputs images and pictures resulting from the processing of the main processor 200 and the graphic processor 100. The storage device 600 may be any one of external storage devices such as a hard disk drive, CD-ROM, MO, and semiconductor memory devices, or a combination of these. Under the control of the OS, the information processing apparatus 1000 loads software by reading the software stored in the storage device 600 into the main memory 50, and performs task processing. The input and output processor 650 controls the foregoing input and output of data between the display unit 500, the storage device 600, and the information processing apparatus 1000.

It should be appreciated that while the bus 40 shown in FIG. 1 is represented by a single line for the sake of simplicity, it may actually be composed of a plurality of buses. Dedicated buses may be provided between predetermined functional blocks.

Figure 2:
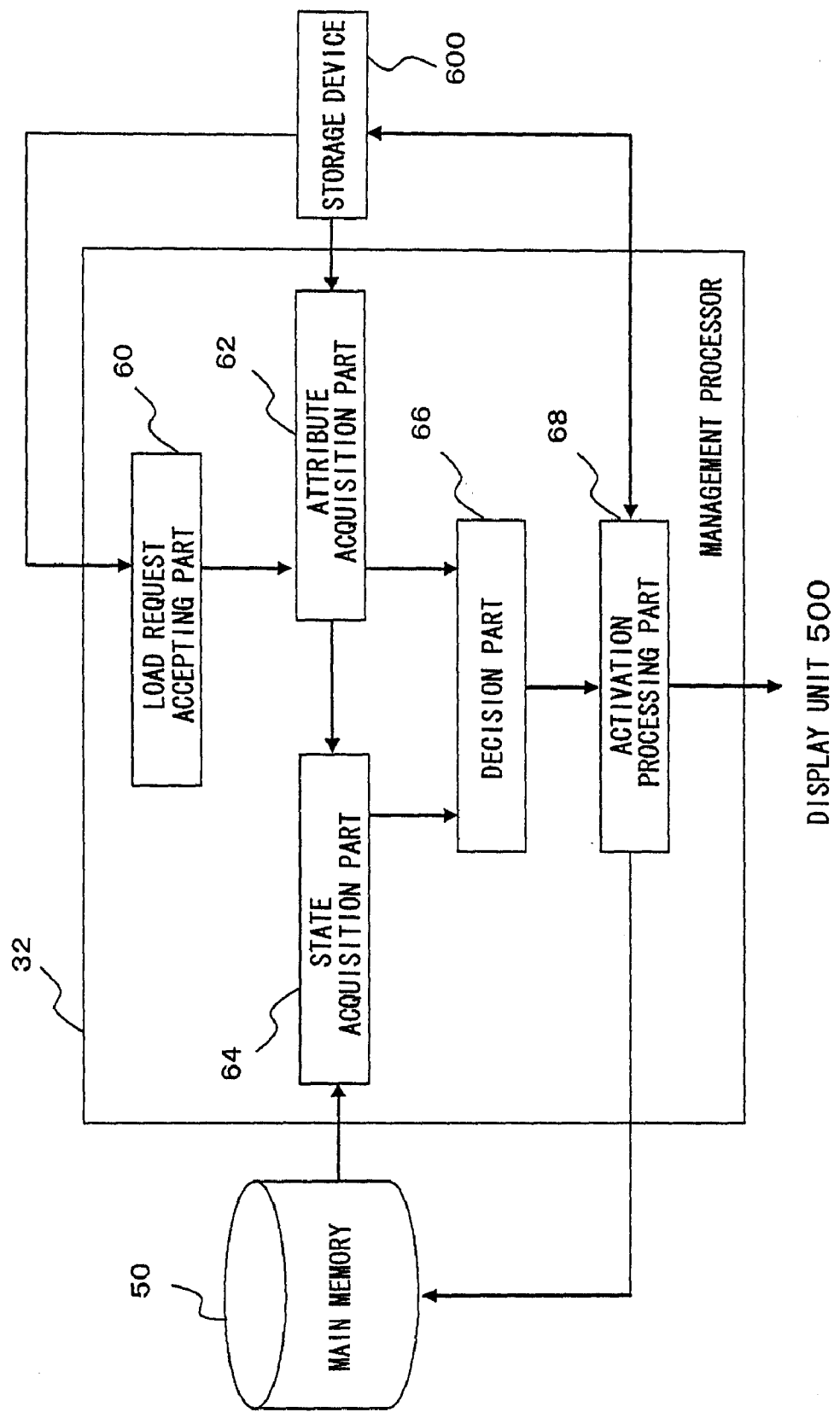
FIG. 2 is a block diagram showing the configuration of an management processor according to the first embodiment.

FIG. 2 is a block diagram showing the configuration of the management processor 32 according to the present embodiment. The management processor 32 includes: a load request accepting part 60 which accepts a load request for software, issued by a user making the information processing apparatus 1000 recognize the software stored in the storage device 600; an attribute acquisition part 62 which reads from the storage device 600 an attribute file of a new piece of software for which the load request is accepted and acquires a processing time required for the new task; a state acquisition part 64 which reads the schedule file from the main memory 50 and acquires the processing time required for reserved tasks; a determination part 66 which compares the processing time required for the new task and processor free time, and determines whether the processing of the new task is executable or not; and an activation processing part 68 which reads the program of the new piece of software that is determined to be executable from the storage device 600, stores it in the main memory 50, allocates the new task to sub processors 30, and updates the schedule file. If the loading of the new piece of software is determined to be not executable, the activation processing part 68 performs load nonpermission processing such as transmitting a signal for rejecting the load request to the storage device 600 which contains the new piece of software and displaying a notification of the disapproved load on the display unit 500 via the input and output processor 650.

Figures 3, 4:
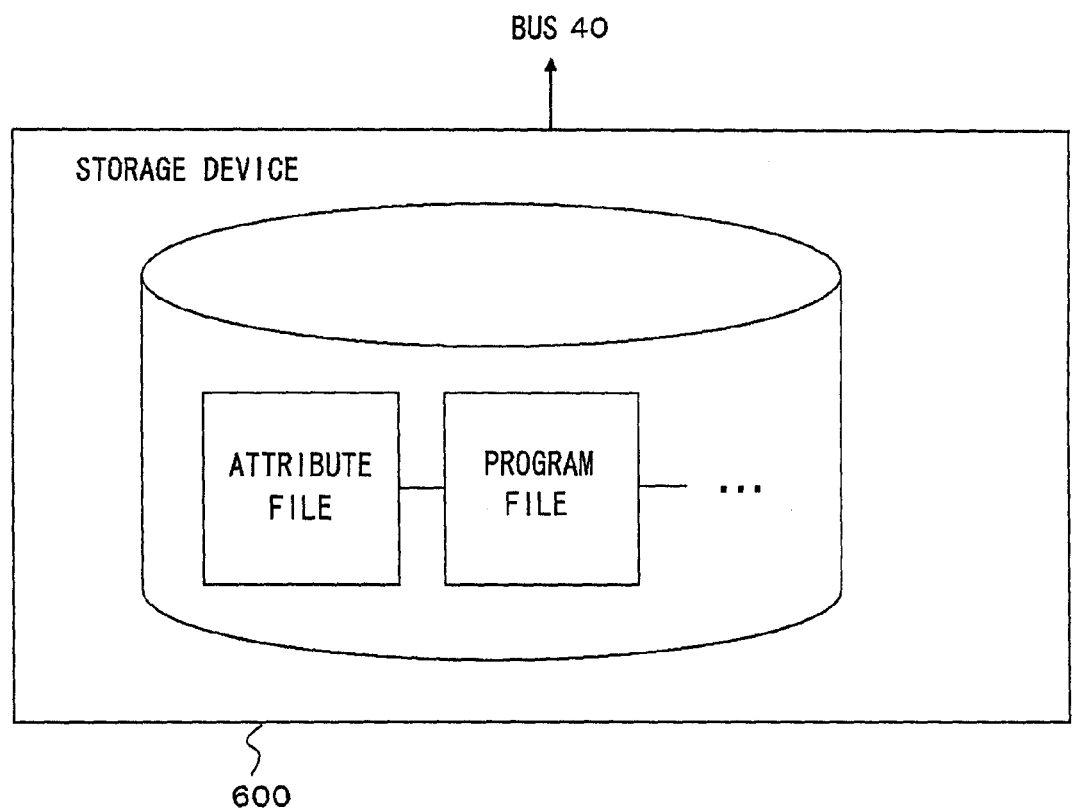
FIG. 3 is a diagram schematically showing the configuration of a storage device according to the first embodiment.
FIG. 4 is a diagram showing an example of the data structure of an attribute file according to the first embodiment.

FIG. 3 schematically shows the configuration of the storage device 600 according to the present embodiment. In the present embodiment, attribute files are stored in the storage device 600 along with program files, or pieces of software themselves, and various types of components and the like.

FIG. 4 shows an example of the data structure of an attribute file according to the present embodiment. An attribute table 70 includes an attribute name field 70a and a required value field 70b. In this instance, for the "processing time" attribute, the required value field 70b describes a processing time required for task processing. In FIG. 4, the required value for the processing time attribute is expressed as an absolute value of the time for which the task occupies the sub processors 30 with respect to a predetermined unit time, which will be described later. The required value for the processing time is a value set by the software maker upon shipping the software product. A value determined by overload verification experiments or the like may be employed.

Aside from the processing time attribute, the attribute may also include an execution permission attribute and a memory capacity attribute. For example, the execution permission attribute shows a condition necessary for execution, such as dongle connection and a serial number entry. The memory capacity attribute shows the memory capacity necessary for processing the task.

Figure 5:
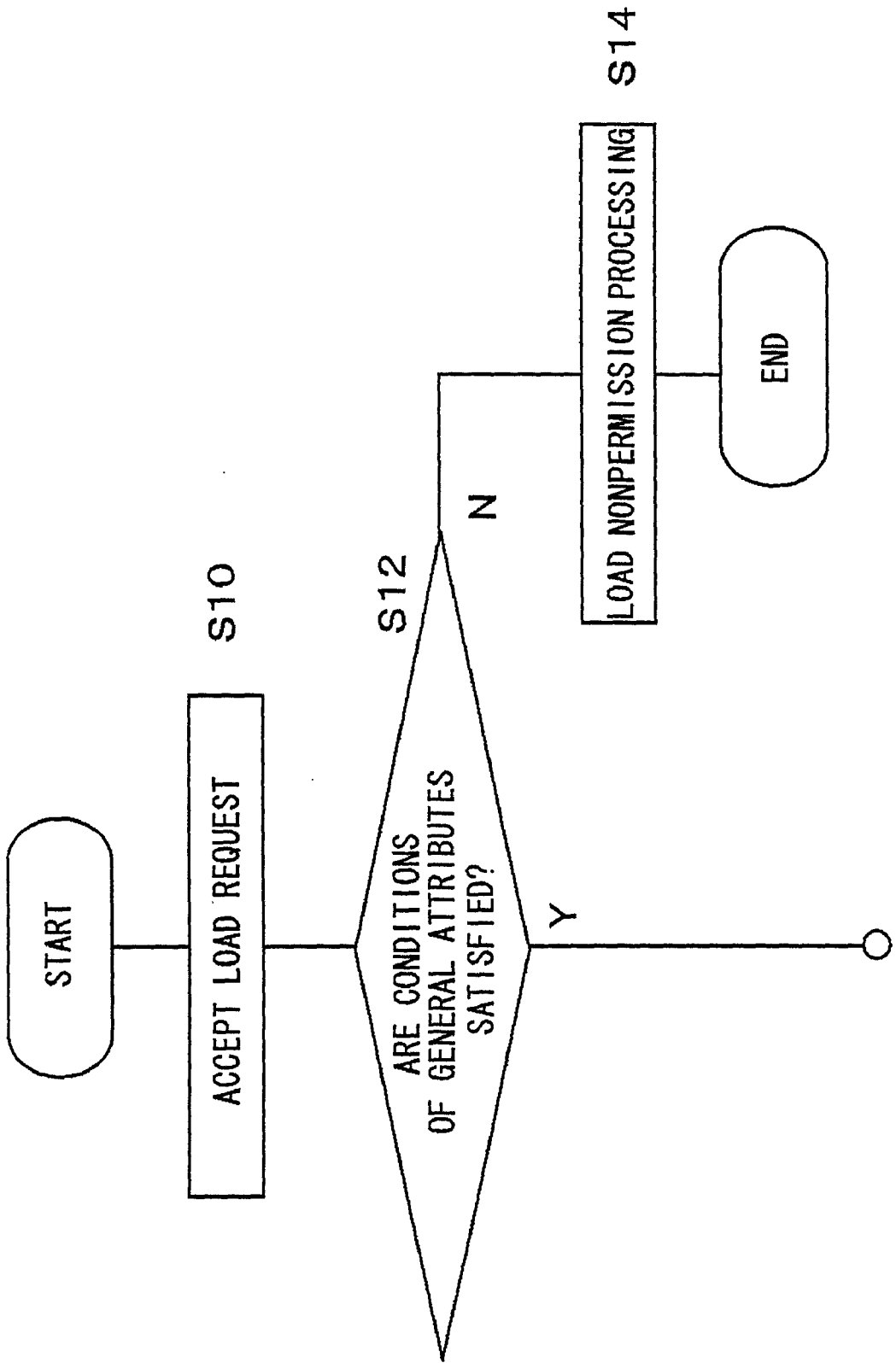
FIG. 5 is a flowchart showing a software loading procedure to be performed in the first embodiment.
Figure 6:
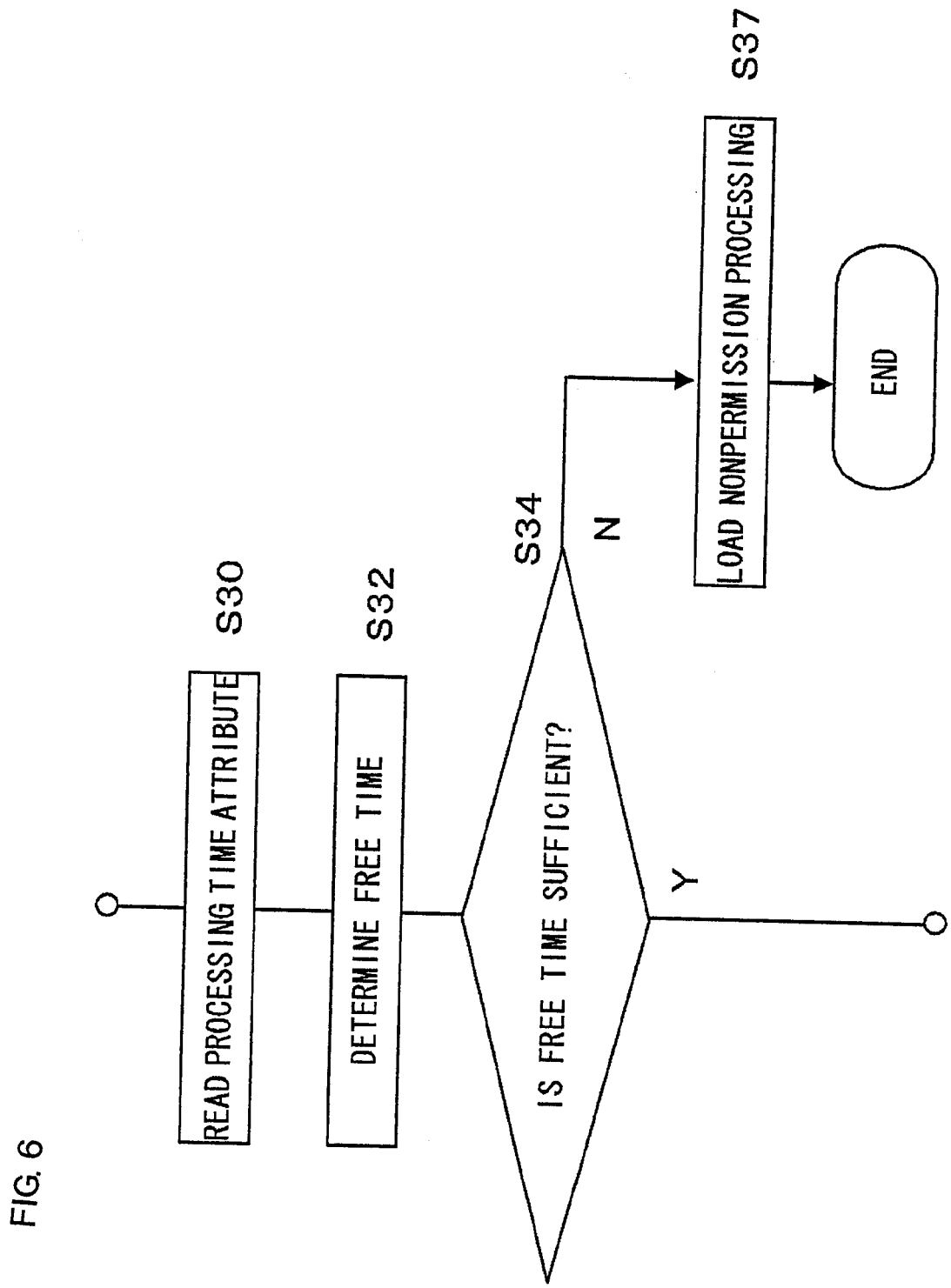
FIG. 6 is a flowchart showing the software loading procedure to be performed in the first embodiment.
Figure 7:
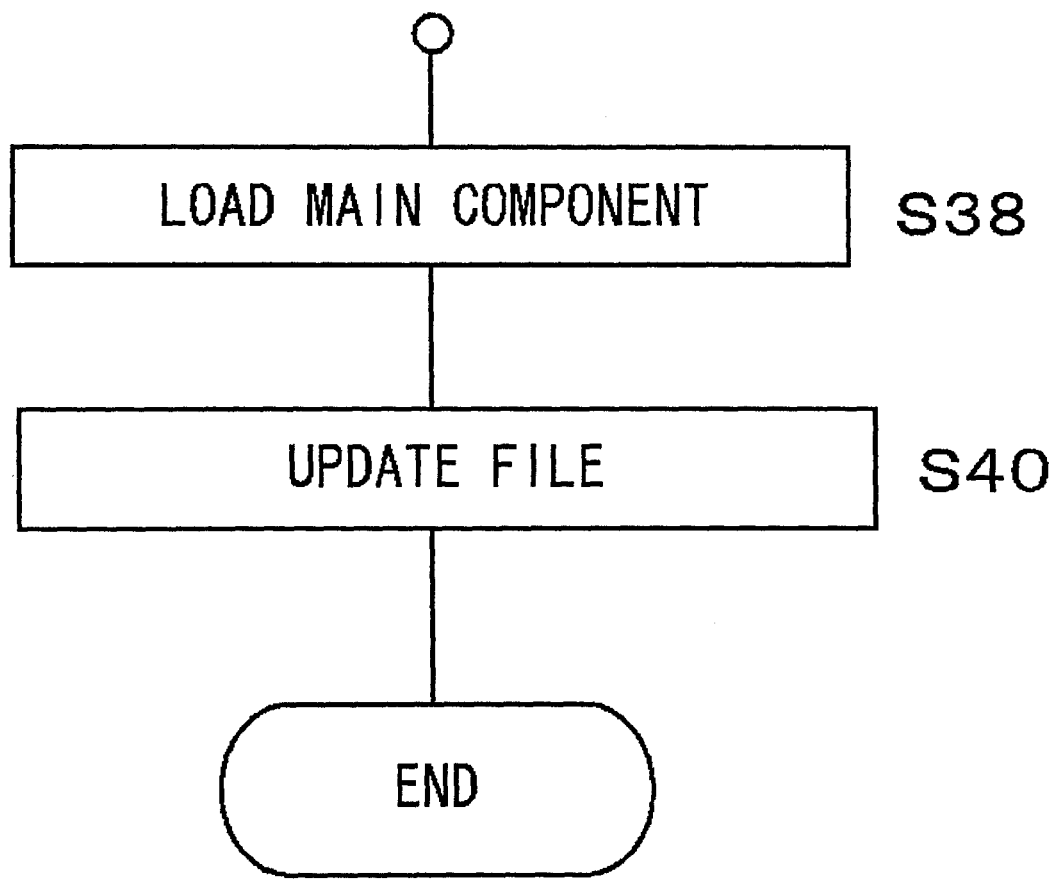
FIG. 7 is a flowchart showing the software loading procedure to be performed in the first embodiment.

The operation using the foregoing configuration will now be described. FIGS. 5, 6, and 7 show the procedure pertaining to loading of software to be performed primarily by the management processor 32. Initially, in FIG. 5, the user makes a load request for a new piece of software to the information processing apparatus 1000 by, for example, inserting a CD-ROM that contains the desired new piece of software, such as a game, into a reader that is connected to the information processing apparatus 1000. The load request accepting part 60 of the management processor 32 receives the load request (S10). It should be appreciated that the storage device 600 for storing the new piece of software is not limited to a CD-ROM, but may also include such storage devices as a hard disk drive, MO, and semiconductor memory devices. Moreover, a request may be issued so that the desired new piece of software is downloaded to the information processing apparatus 1000 from a server which is connected over a network (not shown). A description will now be given of the case where the storage device 600 is a CD-ROM.

When the load request accepting part 60 accepts the load request, the attribute acquisition part 62 acquires the general attributes, such as an execution permission attribute and a memory capacity attribute, included in an attribute file that is stored in the CD-ROM of the new piece of software. Subsequently, the state acquisition part 64 checks the actual states of the respective attributes, and the determination part 66 determines whether or not the actual states satisfy the conditions of the respective attributes (S12). If it is determined that the conditions are not satisfied (N at S12), the activation processing part 68 performs the load nonpermission processing mentioned above (S14) to end the sequence.

On the other hand, if it is determined that the conditions are satisfied (Y at S12), the attribute acquisition part 62, as shown in FIG. 6, detects a processing time attribute in the attribute file and reads the required value (S30). Subsequently, the state acquisition part 64 reads the schedule file from the main memory 50, and determines the free time of the sub processors 30 based on the state of allocation of reserved tasks (S32). Subsequently, the determination part 66 compares the required value for the processing time and the free time of the sub processors 30 (S34). If it is determined from the result of the comparison that the required value for the processing time exceeds the free time of the sub processors 30 (N at S34), the activation processing part 68 performs the load nonpermission processing (S37) to end the sequence.

On the other hand, if it is determined that the required value for the processing time does not exceed the free time of the sub processors 30 (Y at S34), the activation processing part 68, as shown in FIG. 7, reads the new piece of software itself from the CD-ROM into the main memory 50, thereby completing loading (S38). The activation processing part 68 also divides the new task temporally, allocates them to the sub processors 30 in units of time slices, and updates the schedule file that is stored in the main memory 50 (S40). As a result, the sub processors 30 start processing the new task as described above.

Figure 8:
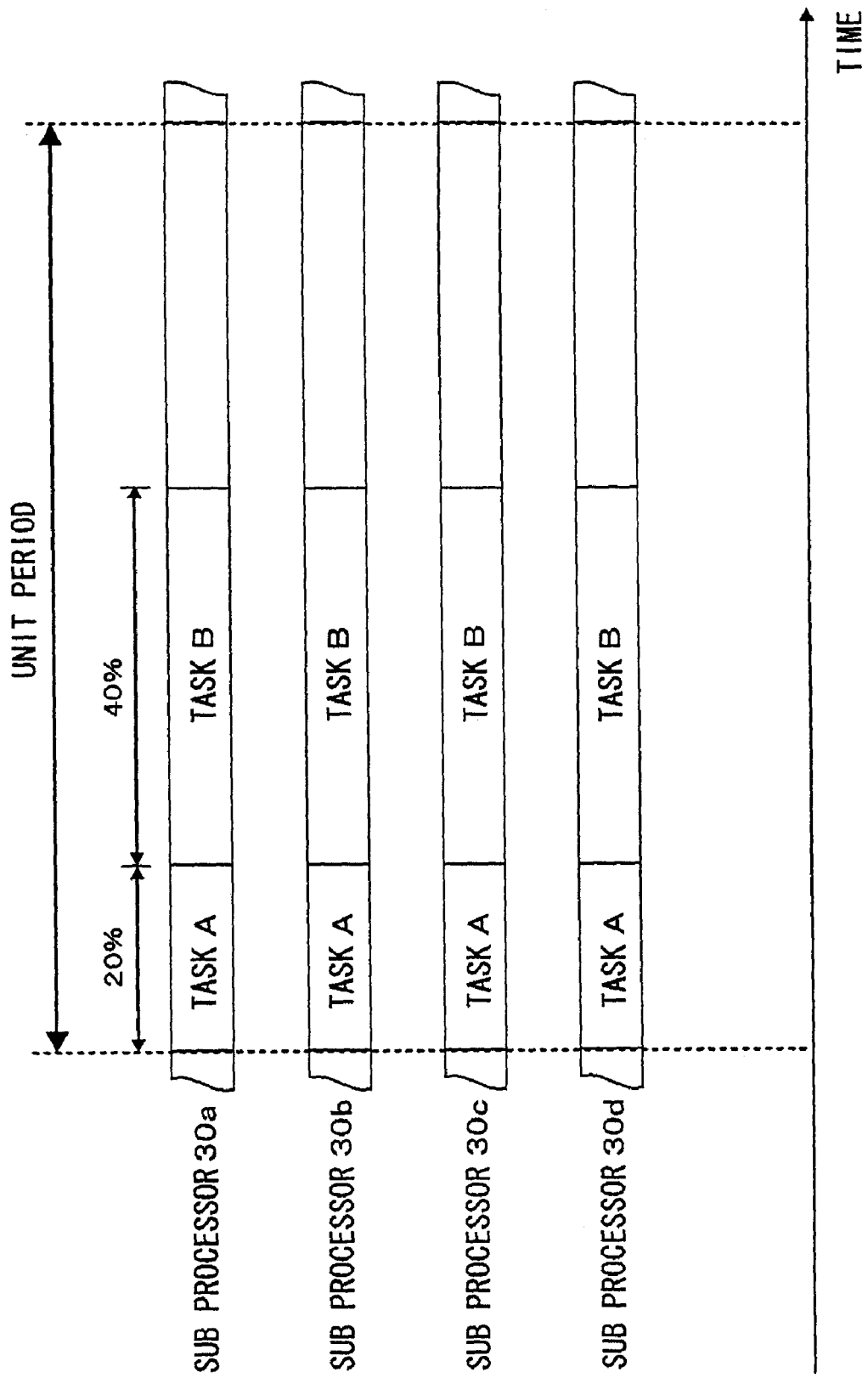
FIG. 8 is a diagram schematically showing an example of how tasks described in a schedule file are allocated according to the first embodiment.

A description will next be given of the processing time attribute. FIG. 8 schematically shows an example of how tasks described in the schedule file are allocated according to the present embodiment. The diagram shows the case where tasks A and B corresponding to two reserved pieces of software, or software A and software B, are divided temporally, and allocated to a plurality of sub processors 30a to 30d so that those tasks are processed in order in a predetermined unit period. The processing in this unit period is repeated to advance the execution of the tasks A and B.

In the present embodiment, the required value for the processing time attribute which is read at S30 is expressed as an absolute value of the processing time that a task requires in this unit period. In the example of FIG. 8, the required values for the processing time attribute of the software A and the software B are 20% and 40% of the unit period, respectively. Given a unit period of 16.6 ms, the required values are thus written as 3.3 ms and 6.6 ms. When these pieces of software are determined to be executable and are loaded, these values are then written to the schedule file at S40, and the tasks are processed by the individual sub processors 30.

Consider here that the user makes a load request for a new software C, whose processing time attribute has a required value of 50% of the unit period. Since the reserved pieces of software A and B shown in FIG. 8 have a total occupancy ratio of 60%, the free time of the sub processors 30, which is determined by the state acquisition part 64 at S32, is 40% by ratio. The determination part 66 therefore determines at S34 that the required value for the processing time attribute of software C exceeds the free time of the sub processors 30, and the software C will not be loaded. On the other hand, if the processing time attribute of software C has a required value of 30% of the unit time, it is determined not to exceed the free time of the sub processors 30, and the software C will therefore be loaded.

In the foregoing cases, the unit period is set in advance by the OS which controls the processing of the management processor 32. The individual pieces of software retain the required values of their processing time attribute in terms of absolute values of the processing time required for the respective tasks within the identical unit period. The period of the vertical synchronizing signal of the display unit 500 is set, for example, as the unit period.

When the pieces of software include three-dimensional graphic processing, like computer games, frame data generated by the cooperation of the sub processors 30 and the graphic processor 100 is stored in the graphic memory 10 and displayed on the display unit 500. The time the display unit 500 takes from the end of display of one frame to the end of display of the next frame is the period of the vertical synchronizing signal. In order to display moving images without a hitch and provide adequate software operations, the processing times to be secured for the pieces of software within the period of the vertical synchronizing signal are therefore determined piece by piece depending on desired resolutions, operating speeds, and the like. Thus, the required values for the processing time attribute are set with the period of the vertical synchronizing signal as a unit, which facilitates settings for ensuring software operations.

In the present embodiment, the processing time attributes are maintained for each piece of software. Subsequently, an adequate operating environment for a piece of software the user requests to load is grasped in advance, and the loading is performed only if it is possible to guarantee adequate operation. This can preclude the occurrence of problems such that software does not achieve user-expected operations when loaded. Moreover, whether or not a minimum task processing time can be secured for reserved software is checked before loading new software. This precludes the loading of new software from hampering the operation of already-activated software. Furthermore, more time slices are selectively secured for pieces of software that include graphic processing or the like and require real-time properties, as compared to pieces of software that require a relatively shorter processing time and impose less temporal limits. This makes it possible to make efficient use of the limited processor resources and increase the capabilities of the system to address user needs.

The foregoing embodiment has dealt with the case where the period of the vertical synchronizing signal is used as the unit period which is common among the pieces of software, and the required values for the processing time attribute are expressed as absolute values of the processing times within that unit period. Nevertheless, the unit period may be set to a multiple or the like of the period of the vertical synchronizing signal. That is, the required values for the processing time attribute may be expressed as a time necessary for task processing within a given unit period. Alternatively, the required values for the processing time attribute may be expressed as time proportions necessary for task processing with respect to a given unit period. Furthermore, the unit period need not necessarily be common among the pieces of software. For example, the processing time attribute may include two values, or a reference value of a unit period and a processing time required within the period, and may be set for each piece of software. Alternatively, the processing time attribute may includes both a specific point in time and the absolute value of a processing time required up to that point. When using these formats of processing time attributes in combination, the processing time attributes are provided with additional identifiers for identifying the description formats so that they are identified by the OS which controls the management processor 32. Then, the determination part 66 may convert the formats of processing time attributes, added to the respective pieces of software, into values conforming to the format of the schedule file based on the identifiers before making a comparison between the processing times required for the tasks and the free time of the sub processors 30. In this case, it is possible to express the processing time attributes in formats suited to the contents of various types of software. The present embodiment can ensure adequate operations of software. Furthermore, the present embodiment can thus be applied without modifying the attribute files of the software even if the format of the schedule file changes depending on the type, update, and the like of the OS.

Second Embodiment

The present embodiment can be practiced by the same configuration as that of the information processing apparatus 1000 shown in FIG. 1 and the management processor 32 shown in FIG. 2 of the first embodiment. The following description will thus be focused primarily on the differences between the present embodiment and the first embodiment.

In the first embodiment, only a required value for the processing time is set as the processing time attribute. As a result, each of the tasks including the new task occupies all the sub processors 30 over a processing time that is indicated by its required value. In other words, the main processor 200 processes only a single task at a time. In the present embodiment, the number of sub processors required is set as a processing time attribute aside from the required value for the processing time, thereby coping with such scheduling that a plurality of tasks is processed at a time.

Figure 9:
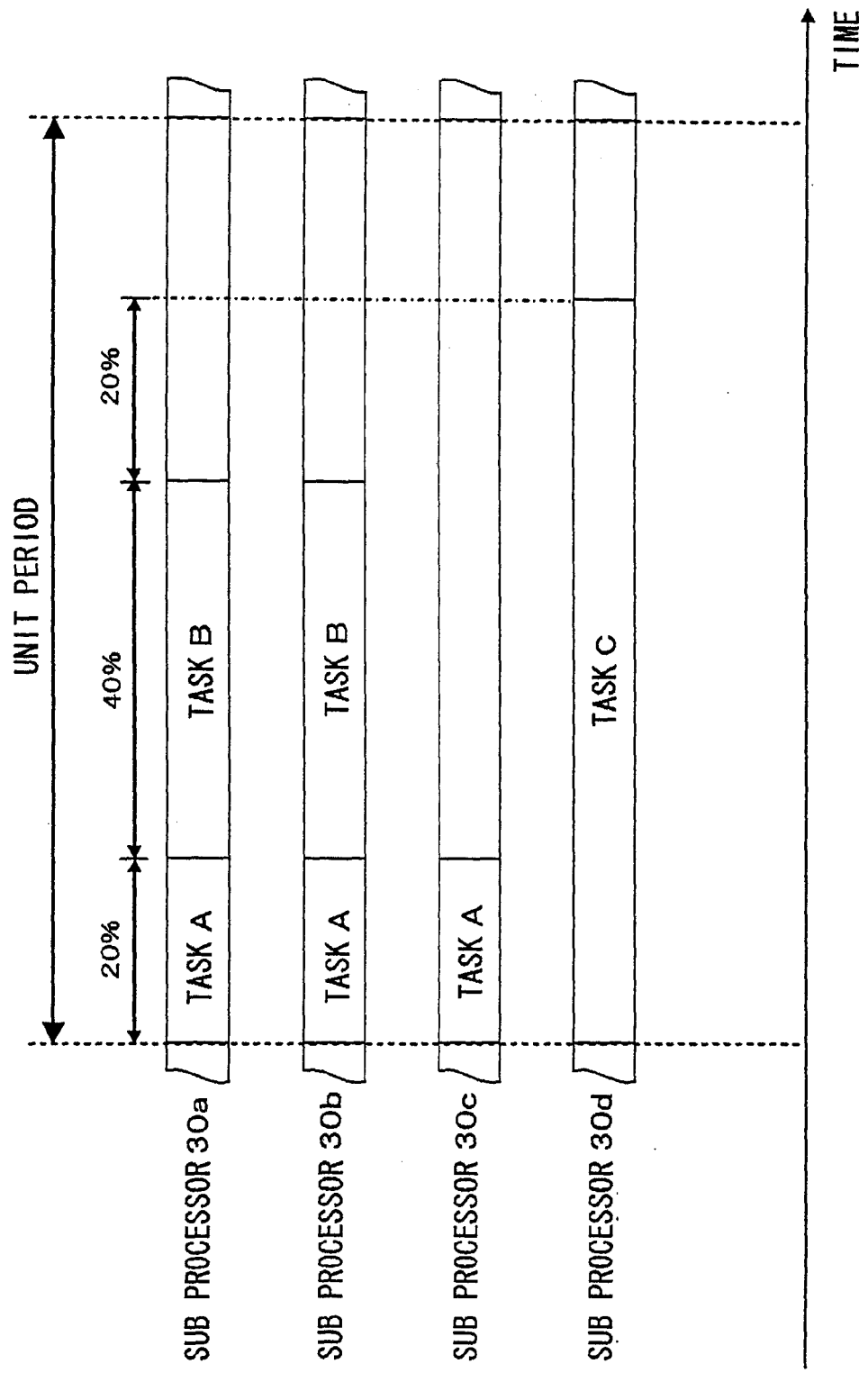
FIG. 9 is a diagram schematically showing an example of how tasks described in a schedule file are allocated according to a second embodiment.

FIG. 9 schematically shows an example of how tasks described in the schedule file are allocated according to the present embodiment. In the present embodiment, both the required number of sub processors 30 and the processing time required when performing processing by using those sub processors 30 can be set as the processing time attributes. This makes it possible to process a plurality of tasks simultaneously. FIG. 9 shows the case where three tasks, or tasks A, B, and C, are scheduled. In such cases as when processing a task that requires a long period of serial processing, like with task C, it is possible to allocate the sub processors 30 to provide efficient processing. The settings of the processing time attributes according to the present embodiment correspond to such a scheduling technique.

FIG. 10 shows an example of the data structure of the attribute file according to the present embodiment. As in the first embodiment, an attribute table 71 of the present embodiment includes an attribute name field 71*a* and a required value field 71*b*. In the present embodiment, the required value field 71*b* contains two values, or the required number of sub processors and the required value of processing time.

A description will now be given of the processing to be performed primarily by the management processor 32 in the present embodiment. The same processing as shown in FIG. 5 of the first embodiment is performed from the acceptance of a load request for a new piece of software to the processing pertaining to the general attributes. FIG. 11 shows a procedure pertaining to the processing time attribute, which follows if it is determined that execution is permitted in terms of the general attributes (Y at S12).

Initially, as in the first embodiment, the processing time attribute in the attribute file is detected, and the required values are read (S30). The free time of the sub processors 30 is determined based on the state of allocation of reserved tasks described in the schedule file (S32). Then, a comparison is made between the required value for the processing time and the free time of the sub processors 30 (S34). Note that the "required value" according to the present embodiment consists of the foregoing two values, and the "free time" is that sub processors as many as required have simultaneously as described above.

According to the present embodiment, if it is determined that the required processing time exceeds the free time of the sub processors 30 (N at S34), a tentative adjustment is made to the allocation schedule of the reserved tasks described in the schedule file (S35). Then, a comparison is made again between the required values of the processing time and the free time of the sub processors 30 (S36). The tentative adjustment in schedule to be made here refers to thought-experimental processing which is performed by calculation alone independent of the actual task processing. If it is determined that the required value for the processing time does not exceed the free time of the sub processors 30 (Y at S34, Y at S36), the activation processing part 68 completes loading (S38) and updates the schedule file (S40) as shown in FIG. 7 of the first embodiment. In this instance, if the loading is permitted on the tentatively-adjusted schedule, the tentative adjustment is also reflected in the schedule file. If it is impossible to secure sufficient free time even after the tentative adjustment in schedule (N at S36), the load nonpermission processing is performed on the new piece of software (S37) to end the sequence as in the first embodiment.

Taking the state of allocation shown in FIG. 9 as an example, the procedure shown in FIG. 11 will now be described. Consider, for example, that a new piece of software the user requests to load has a processing time attribute such that the required number of sub processors 30 is three and the required value for the processing time is equivalent to 20% of the unit period. The three sub processors 30*a*, 30*b*, and 30*c* can secure a free time of 40% of the unit period by ratio after the point in time when the task B is completed. At S34, it is therefore determined that the free time is sufficient. On the other hand, if the required number of sub processors 30 is one and the required value for the processing time is equivalent to 90% of the unit period, it is determined at S34 that the required value for the processing time exceeds the free time because the sub processor 30*c* even having the longest free time has free time of 80% of the unit period. Then, at S35, the schedule is tentatively adjusted so that the sub processor 30*c* processes the task C after processing the task A. This gives the sub processor 30*d* free time of 100% of the unit period. At S36, it is therefore determined that the required value for the processing time does not exceed the free time, and the loading of the new piece of software is permitted.

According to the present embodiment, as in the first embodiment, the operating environment for a load-requested piece of software is grasped and the loading is performed only if adequate operation of the software is guaranteed. It is therefore possible to prevent the new piece of software and reserved pieces of software from causing problems in operation. Moreover, the processing modes of the respective tasks, such as one requiring a short period of parallel processing and one requiring a long period of serial processing, are in advance acquired as time processing attributes. This makes it possible to cope flexibly with scheduling not only in terms of allocating the processing time but also in terms of allocating the sub processors 30 as well, so that a determination on load permission can be made with greater flexibility. As a result, it is possible to obtain the foregoing effects with a more efficient use of resources, thereby increasing the capabilities of the system to address user needs.

Third Embodiment

The present embodiment can be practiced by the same configuration as that of the information processing apparatus 1000 shown in FIG. 1 and the management processor 32 shown in FIG. 2 of the first embodiment. The following description will thus be focused primarily on the differences between the present embodiment and the first and second embodiments.

In the first and second embodiments, the processing time attribute in the attribute file is acquired in response to a load request for a new piece of software. In the present embodiment, a bus bandwidth attribute is acquired as well. Then, whether the new piece of software is executable or not is determined based on a bus bandwidth reservation file which describes the state of reservation of the bus bandwidth for reserved tasks.

FIG. 12 shows an example of the data structure of the attribute file according to the present embodiment. An attribute table 72 according to the present embodiment includes an attribute name field 72a, a required value field 72b, and an identifier field 72c. In this instance, for the "processing time" attribute, the required value field 72b describes the number of sub processors 30 and the processing time required for processing the task. For the "bus bandwidth" attribute, it describes the ratios of bus bandwidth required for transferring data during task processing. The required ratios of bus bandwidth are ratios that are required with respect to the bandwidth of the bus 40 which is included in the information processing apparatus 1000. The required ratios of bus bandwidth may be replaced with the absolute values of the bus bandwidth required, or data transfer rates required. By using clock frequency characteristics of the information processing apparatus 1000, it is possible to calculate the required bus bandwidths from the required data transfer rates.

A plurality of required values may be set for the bus bandwidth since the bus bandwidth can vary such as in the case where dedicated buses are formed depending on data-transferring sections, and tasks can require respective different transfer rates. In particular, data transfer between the main memory 50 and the main processor 200, transfer between the graphic processor 100 and the main processor 200, and transfer between the main processor 200 and the input and output processor 650 have significant effects on the processing speeds of tasks. In the present embodiment, the ratios of bus bandwidth required for those sections are set as the required values for bus bandwidth. For this reason, identifiers for identifying the sections of the bus 40 corresponding to the respective required values are described in the identifier field 72c. In the example of FIG. 12, "mem" represents the bus 40 between the main memory 50 and the main processor 200, "gra" represents the bus 40 between the graphic processor 100 and the main processor 200, and "io" represents the bus 40 between the main processor 200 and the input and output processor 650. Like the processing time attribute, the required values of bus bandwidth are also set to values that are obtained by overload verification experiments or the like.

Figure 13:
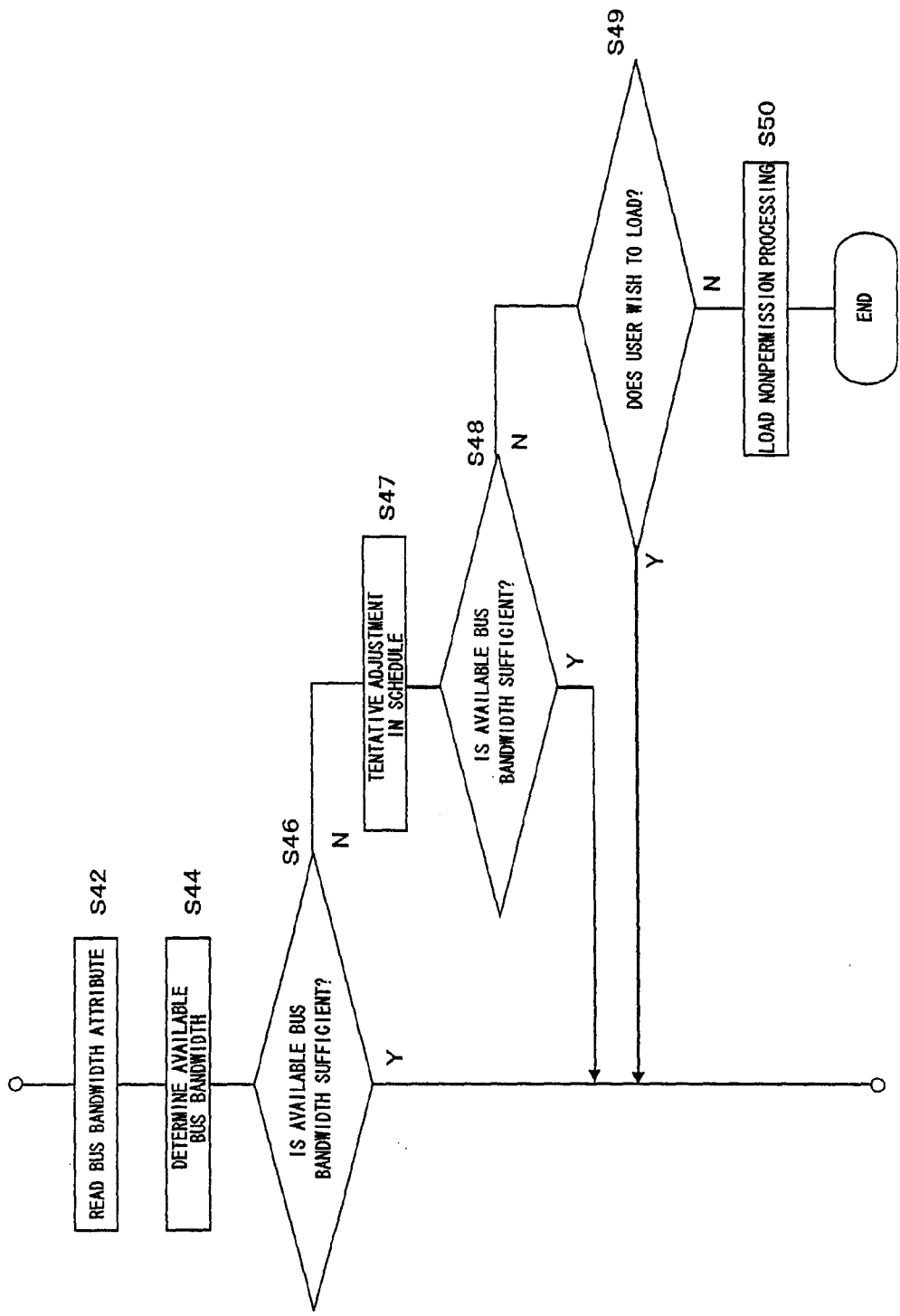
FIG. 13 is a flowchart showing a software loading procedure to be performed in the third embodiment.

A description will now be given of processing to be performed primarily by the main processor 32 in the present embodiment. The same processing as shown in FIG. 5 of the first embodiment and FIG. 11 of the second embodiment is performed from the acceptance of a load request for a new piece of software to the processing pertaining to the processing time attribute. FIG. 13 shows a procedure pertaining to the bus bandwidth attribute, which follows if it is determined that execution is permitted in terms of the processing time attribute (Y at S34, Y at S36).

Initially, the attribute acquisition part 62 detects the bus bandwidth attribute in the attribute file, and reads all the required values and the identifiers (S42). Next, the state acquisition part 64 acquires the bus bandwidth reservation file from the main memory 50. Based on the total bus bandwidth reserved by reserved tasks to be processed simultaneously, it determines temporal changes of the bus bandwidth available to the new task with respect to each of the bus sections identified by the identifiers (S44). The bus bandwidth reservation file is a file which describes required values for the bus bandwidth attribute and identifiers, read when loading the reserved pieces of software. Meanwhile, temporal changes of available bus bandwidth calculated in advance may be stored in the main memory 50 as a separate file. Each time a piece of software is loaded or unloaded, the parameters may be calculated again to update the file. In this case, the foregoing step S44 has only to make reference to this file.

The determination part 66 then compares the required values in the bus bandwidth attribute of the new piece of software and the available bus bandwidths in the respective bus sections (S46). Since the available bus bandwidths are time-dependent variables depending on the processing schedule of the reserved tasks, the comparisons in the processing of S46 are actually made based on both the processing time and the bus bandwidth required for the new task. If it is determined that the bus bandwidth required for the new task exceeds the available bus bandwidth in any of the bus sections (N at S46), the same adjustment as in the second embodiment is initially made to the allocation schedule of the reserved tasks described in the schedule file (S47). Then, a comparison is made again between the required value of the bus bandwidth attribute and the available bus bandwidths (S48). If a sufficient bus bandwidth cannot be secured even after the schedule adjustment (N at S48), a notification that the bus bandwidth required for the new task is not available is displayed on the display unit 500. The user is asked whether or not to continue the load processing (S49).

If the user cancels loading (N at S49), the activation processing part 68 performs the load nonpermission processing described in the first embodiment (S50) to end the sequence. On the other hand, if it is determined that the bus bandwidth required for the new task can be scheduled so as not to exceed the available bus bandwidth at any point of time (Y at S46, Y at S48), or if the user wishes to continue loading even though the required bus bandwidth exceeds the available bus bandwidth (Y at s49), then the activation processing part 68 completes loading (S38) and updates the schedule file (S40) as in FIG. 7. In this instance, if the loading is permitted on the tentatively-adjusted schedule, the tentative adjustment is also reflected in the schedule file. At S40, the bus bandwidth available for the task of the loaded software is also written to the bus bandwidth reservation file. In this instance, if the required bus bandwidth does not exceed the available bus bandwidth (Y at S46), the required bus bandwidth is written to the bus bandwidth reservation file. If the required bus bandwidth exceeds the available bus bandwidth (N at S46) and the user selects to load the new piece of software (Y at S49), the available bus bandwidth acquired at S44 is written to the bus bandwidth reservation file for reservation. If the available bus bandwidth varies with time, the minimum value may be used as the available bus bandwidth. The temporal changes may be directly reflected in reservation. Consequently, the new task is processed using a desirable bus bandwidth if the required bus bandwidth can be secured, and is processed using the maximum available bus bandwidth if the required bus bandwidth cannot be secured.

Again, taking the state of allocation shown in FIG. 9 as an example, the procedure shown in FIG. 13 will be described below. Consider that the three reserved tasks A, B, and C shown in FIG. 9 have reserved bus bandwidths of 60%, 40%, and 40% in a certain transfer section, respectively. Consider also that the new piece of software the user requests to load has a processing time attribute such that the required number of sub processors 30 is three and the required value for the processing time is 20% of the unit period. The bus bandwidth attribute has a required value of 80%. In this case, in the processing pertaining to the processing time attribute of FIG. 11, the three sub processors 30*a*, 30*b*, and 30*c* have sufficient free time after the completion of the task B as described in the second embodiment. Then, it is determined that the new piece of software is executable, for example, when the new task is allocated to the three sub processors 30*a*, 30*b*, and 30*c* immediately after the task B. If such an allocation is made, however, the new task is started while the sub processor 30*d* is processing the task C which has a required bus bandwidth value of 40%, or an available bus bandwidth of 60%. When making a determination as to the bus bandwidth attribute, i.e., at S46 in FIG. 13, it is therefore determined that the required bus bandwidth of 80% exceeds the available bus bandwidth.

Thus, at S47, the schedule is tentatively adjusted so as to allocate the new task to any three of the four sub processors 30*a*, 30*b*, 30*c*, and 30*d* after the completion of processing of the task C. Since no reserved task is processed after the completion of processing of the task C, the available bus bandwidth is 100% It is determined at S48 that the required bus bandwidth does not exceed the available bus bandwidth, and the loading of the new piece of software is permitted. In this example, the tentative adjustment in schedule is made for the new task alone. Nevertheless, as in the second embodiment, tentative adjustments may also be made to the schedule of the reserved tasks at the same time so that the new task satisfies both the required values of the processing time and the bus bandwidth. Alternatively, a tentative adjustment in schedule may be made for the reserved tasks alone.

When tasks to be processed by the main processor 200 simultaneously, such as the tasks A and C in the foregoing example, require a bus bandwidth of 100% in total, hardware control is exercised so that they do not exceed their respective reserved values of bus bandwidth. Consequently, if pieces of software are permitted to load and their required bus bandwidth values are reserved once according to the present embodiment, the required values at least can be guaranteed no matter what other software is additionally executed. On the other hand, if the required bus bandwidth values fall below 100% in total, like the tasks B and C, the rest of the bus bandwidth may be allocated to both the tasks as appropriate by hardware control. This allows for more efficient use of the resources.

For example, when executing software that includes three-dimensional graphic processing, such as with a computer game, in the information processing apparatus 1000 shown in FIG. 1, the image processing included in the tasks processed by the main processor 200 is performed by the graphic processor 100 and the information pertaining to the image processing is stored in the main memory 50. Thus, in order to generate and display frame data on the display unit 500 without a hitch so as to guarantee the real-time properties of the game, the data transfer rates pertaining to the image processing between the main processor 200 and the main memory 50 and between the main processor 200 and the graphic processor 100 are important factors aside from the processing speeds of the individual processors. That is, if necessary data fails to be transferred in time with the generation of the frame data, the frame rate of display on the display unit 500 can eventually be affected. Then, in the present embodiment, the minimum bus bandwidths required for presenting moving images with desirable resolutions and operating speeds are retained as bus bandwidth attributes for respective pieces of software. This makes it possible to grasp the adequate operating environment for a new piece of software before loading it as in the first and second embodiments, and prevent the occurrence of problems such as where the software fails to achieve user-expected operations when loaded.

Meanwhile, the present embodiment still provides the possibility of loading a new task even if it requires a bus bandwidth that exceeds an available bus bandwidth. The reason for this is that even if the desirable bus bandwidth is not available, users may sometimes tolerate a low-rate progression. Then, a warning that the operating speed can possibly drop may be displayed in the user confirmation processing of S49.

According to the present embodiment, it is possible before loading new software to preclude problems unexpected by the user that could occur during the operation of a new piece of software, and guarantee the bus bandwidths required for the software tasks that are already in execution. This precludes the loading of the new piece of software that could cause problems during the operation of those pieces of software. Furthermore, greater bus bandwidths are secured selectively for tasks that include graphic processing or the like and require real-time properties, as compared to tasks that transfer smaller amounts of data or impose less stringent temporal limits. This makes it possible to make efficient use of the limited processor resources and increase the capabilities of the system to address user needs. As in the first and the second embodiments, the present embodiment also includes checking the processing time attribute, and it is therefore possible to check and select tasks both in terms of the processing time and the bus bandwidth. Moreover, since scheduling can be made according to the processing modes of the respective tasks, it is possible to make more effective use of resources and guarantee adequate operation.

Fourth Embodiment

The present embodiment can be practiced by the same configuration as that of the information processing apparatus 1000 shown in FIG. 1 and the management processor 32 shown in FIG. 2 of the first embodiment. The following description will thus be focused primarily on the differences between the present embodiment and the first and second embodiments.

In the first and second embodiments, the processing time attribute in the attribute file is acquired in response to a load request for a new piece of software. In the present embodiment, a priority attribute is acquired as well. Then, whether the new piece of software is executable or not is determined based on a priority file which describes the priorities of reserved tasks. In this case, however, the reserved pieces of software are also subjected to the determination whether executable or not.

FIG. 14 shows an example of the data structure of the attribute file according to the present embodiment. As in the first embodiment, an attribute table 74 according to the present embodiment includes an attribute name field 74*a* and a required value field 74*b*. In this instance, for the "processing time" attribute, the required value field 74*b* describes the number of sub processors 30 and the processing time required for processing the task. For the "priority" attribute, it describes the priority of the task.

The priorities are relative values to be compared between a new task and reserved tasks or between reserved tasks alone, and are expressed in a five-level scale of natural numbers from, for example, 1 to 5. FIG. 14 shows an example where the priority is "4" out of the five levels. The priorities are set depending on the contents of the software when shipped.

Figure 15:
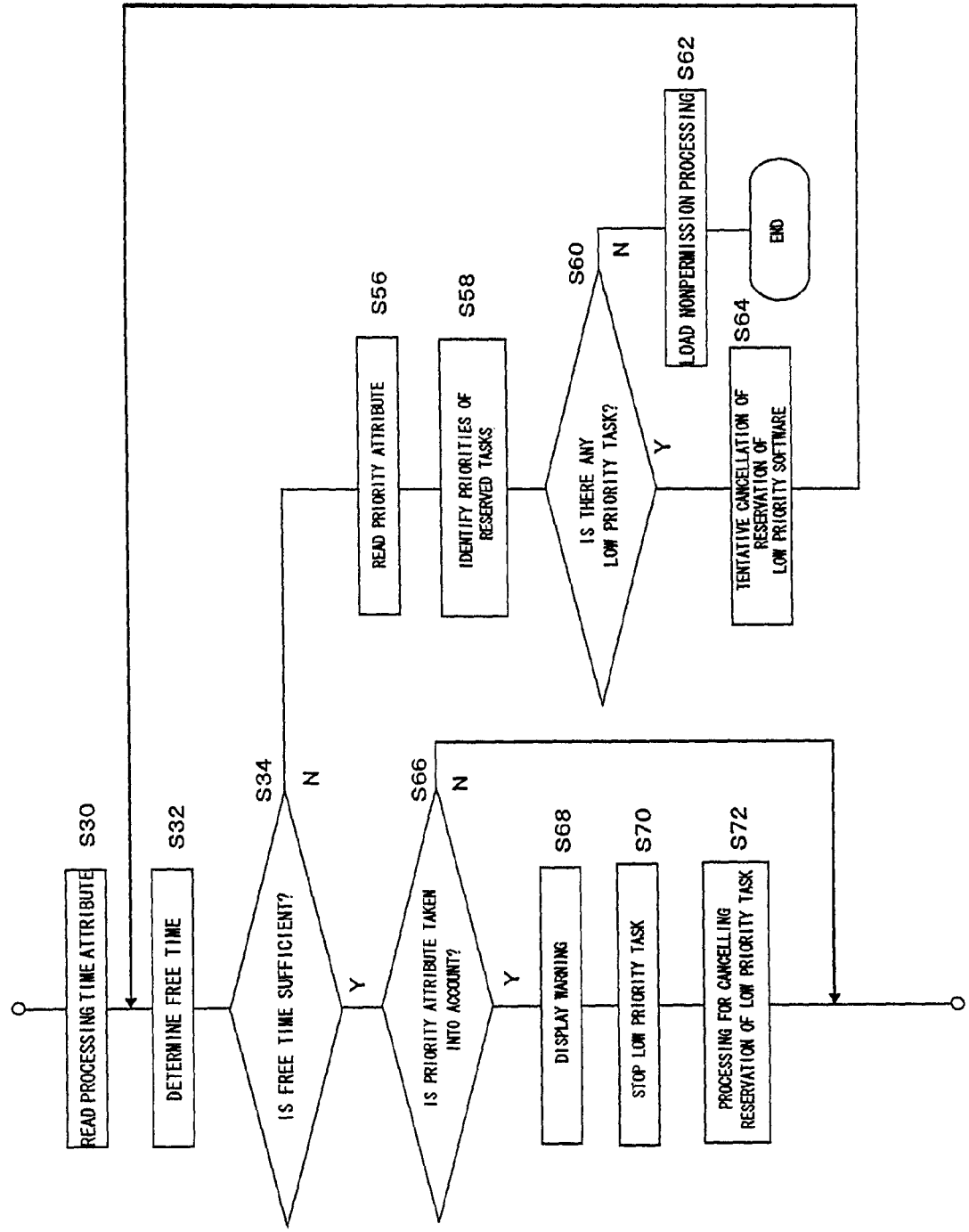
FIG. 15 is a flowchart showing a software loading procedure to be performed in the fourth embodiment.

A description will now be given of processing to be performed primarily by the main processor 32 in the present embodiment. The same processing as in FIG. 5 of the first embodiment is performed from the acceptance of a load request for a new piece of software to the processing pertaining to the general attributes. FIG. 15 shows a procedure pertaining to the processing time attribute and the priority attribute, which follows if it is determined that execution is permitted in terms of the general attributes (Y at S12).

Initially, as in the second embodiment, the processing time attribute in the attribute file is detected to read the required values (S30). The free time of the sub processors 30 is determined based on the state of allocation of reserved tasks described in the schedule file (S32). Then, a comparison is made between the required value for the processing time and the free time of the sub processors 30 (S34). If a sufficient amount of free time is not available in the initial schedule of the reserved tasks, a tentative adjustment is made in the schedule before another comparison is made as in the second embodiment. In the interests of providing a simple drawing, these processes shall also be included in S34 in FIG. 15.

In the present embodiment, if it is determined that the required processing time exceeds the free time of the sub processors 30 (N at S34), the attribute acquisition part 62 detects and reads the priority attribute in the attribute file (S56). Next, the state acquisition part 64 acquires the priority file from the main memory 50, and identifies all the priorities of the reserved tasks (S58). The priority file is a file which contains priority data that is read when loading the reserved software.

The determination part 66 then compares the priority of the new task and the priorities of the reserved tasks (S60). If there are any reserved tasks that have a priority lower than that of the new task (hereinafter, referred to as low priority tasks) (Y at S60), one of these low priority tasks is extracted, for example, based on the task priorities. The processing reservation for the extracted low priority task is tentatively cancelled (S64) to calculate the tentative free time of the sub processors 30 (S32). The determination part 66 then compares the processing time required for the new task and the tentative free time (S34). If the tentative free time is still insufficient, the processing for adjusting the schedule of the rest of the reserved tasks and making another comparison may be included. The tentative cancellation of reservation and the like are thought-experimental processing which is performed by calculation alone independent of the actual task processing.

If the processing time required for the new task does not exceed the free time (Y at S34), a warning that the extracted low priority task will be stopped is displayed on the display unit 500 (S68). Then, the task is stopped (S70), and its reservation is cancelled from the schedule file (S72). Then, as shown in FIG. 7, the loading is completed (S38) and the schedule file is updated (S40). At S40, the priority of the task of the loaded software is also written to the priority file. When issuing the warning about the stop of the low priority task at S68, whether or not to stop the execution of the low priority task may be decided by the user. In this case, if the user rejects the stop of execution of that task, the load nonpermission processing on the new piece of software is performed to end the sequence. On the other hand, if the user accepts the execution stop, processing for loading the new piece of software is performed as described above.

If the required processing time exceeds the tentative free time (N at S34) and the priority file contains another low priority task (Y at S60), then the tentative free time when that task is tentatively cancelled (S64) and the processing time required for the new task are compared (S32, S34). The foregoing processing is repeated until the processing time required for the new task no longer exceeds the tentative free time (Y at S34). If there is no other low priority task that can be cancelled before that (N at S60), the load nonpermission processing on the new piece of software is performed (S62). Through these processes, it is possible to stop already-running tasks that have lower priorities and activate the new task instead.

According to the present embodiment, as in the first and second embodiments, it is possible before loading software to preclude problems unexpected by the user that could occur during the operation of new software and during the operation of reserved software. This allows for more efficient use of processor resources. Moreover, the present embodiment incorporates the priority attribute. Even when the processing time required for a new task exceeds the free time of the sub processors 30, it is still possible to determine whether or not to accept the loading, even in view of stopping reserved tasks. This allows a flexible response in accordance with the contents of the software and the like.

Fifth Embodiment

The present embodiment can be practiced by the same configuration as that of the information processing apparatus 1000 shown in FIG. 1 and the management processor 32 shown in FIG. 2 of the first embodiment. The following description will thus be focused primarily on the differences between the present embodiment and the first to fourth embodiments.

In the fourth embodiment, the priority attribute is incorporated into the comparison between the processing time attribute required for a new task and the free time of the sub processors 30. In the present embodiment, the same priority attribute is also referred to when making a comparison between the bus bandwidth required for a new task and the available bus bandwidth based on the bus bandwidth reservation file, which has already been described in the third embodiment. Moreover, in the present embodiment, the bus bandwidth attribute is expressed in two levels, an optimum bus bandwidth and a minimum required bus bandwidth. Then, based on the priorities of the new task and the reserved tasks, the bus bandwidths to be used by the respective tasks are adjusted when making a determination as to whether the task is executable or not.

FIG. 16 shows an example of the data structure of the attribute file according to the present embodiment. An attribute table 76 according to the present embodiment includes an attribute name field 76a, a first required value field 76b, a second required value field 76c, and an identifier field 76d. For the "processing time" attribute, the first required value field 76b describes the number of sub processors 30 and the processing time required for processing a task. For the "priority" attribute, the first required value field 76b describes the priority of the task. For the "bus bandwidth" attribute, the first required value field 76b describes the ratios of bus bandwidth that are optimum for processing the task, the second required value field 76c describes the minimum required ratios of bus bandwidth not to cause problems during operation, and the identifier field 76d describes identifiers for identifying bus sections. Each task is compared with other tasks in priority to determine the bus bandwidth for use, based on the numeric values described in the first required value field 76b and the second required value field 76c. The determination procedure will be now described.

FIG. 17 shows an example of the data structure of a bus bandwidth reservation table which is contained in the bus bandwidth reservation file referred to in the present embodiment. The bus bandwidth reservation table 78 includes a software name field 78a, a task number field 78b, an optimum value field 78c, a minimum value field 78d, and a used value field 78e. Tasks scheduled for respective pieces of software are numbered, and the task number field 78b describes those numbers. The optimum value field 78c and the minimum value field 78d describe first required values and second required values read from the bus bandwidth attributes of the respective pieces of software as optimum bus bandwidths and minimum bus bandwidths, respectively. Moreover, the used value field 78e describes the ratios of bus bandwidth that are currently reserved, i.e., available for the respective tasks. These used bus bandwidths are determined automatically by processing pertaining to the bus bandwidth attribute, to be described later. The optimum value is the upper limit, and the minimum value is the lower limit of the used value of bus bandwidth. As has been described in the third embodiment, the used values of bus bandwidth at least are guaranteed by the hardware.

Figure 18:
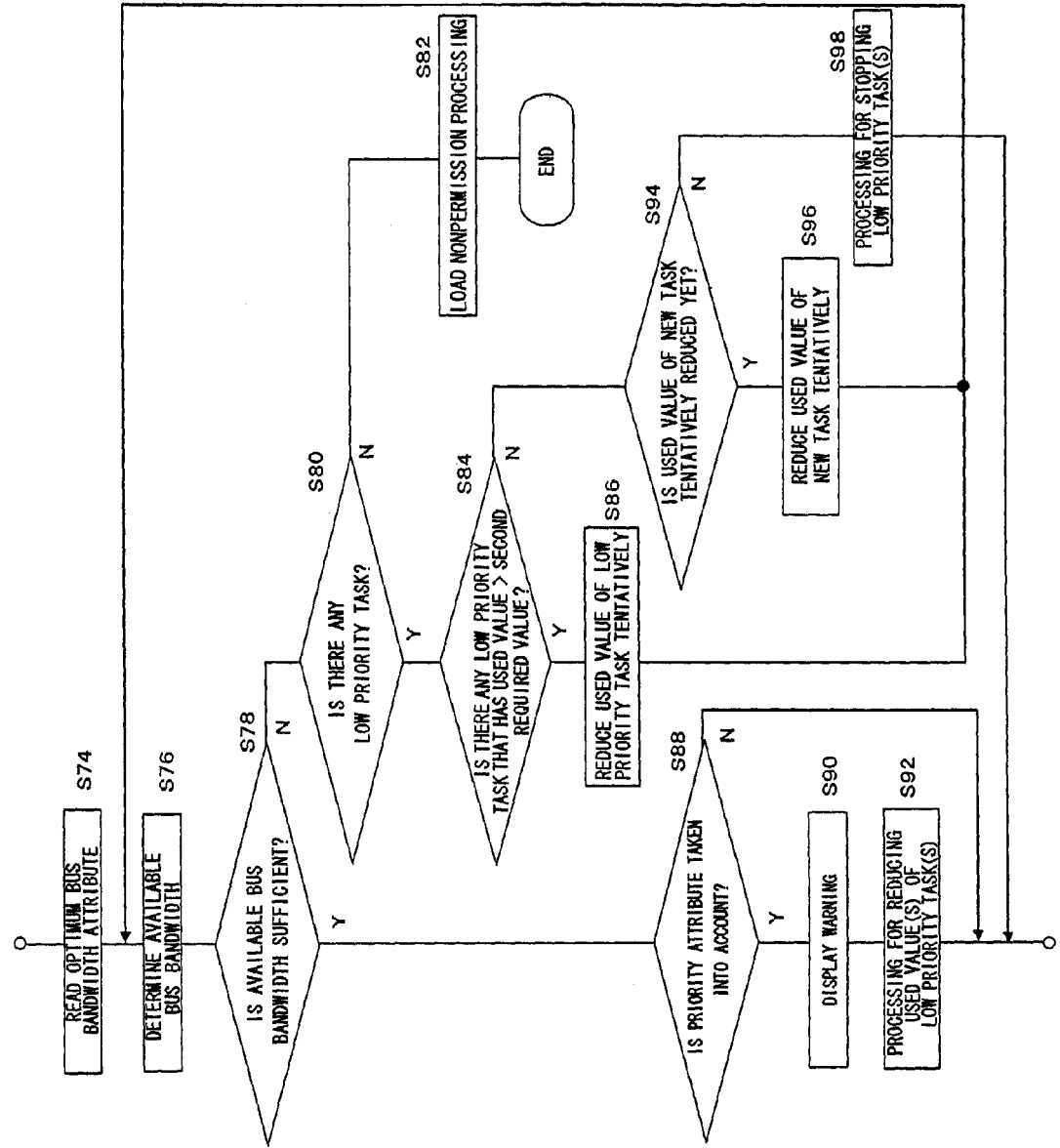
FIG. 18 is a flowchart showing a software loading procedure to be performed in the fifth embodiment.

A description will now be given of processing to be performed primarily by the main processor 32 in the present embodiment. The same processing as in FIG. 5 of the first embodiment and FIG. 15 of the fourth embodiment is performed from the acceptance of a load request for a new piece of software to the priority-based processing pertaining to the processing time attribute. FIG. 18 shows a priority-based procedure pertaining to the bus bandwidth attribute, which follows if it is determined that execution is permitted in terms of the processing time attribute (Y at S34, S66 to S72).

Initially, the attribute acquisition part 62 detects the bus bandwidth attribute in the attribute file of new software, and reads the first required values, the second required values, and the identifiers (S74). Next, the state acquisition part 64 determines temporal changes of the bus bandwidth available in each bus section based on the bus bandwidth reservation file (S76).

The determination part 66 then acquires the first required values out of the bus bandwidth attribute of the new software, and compares them with the bus bandwidths available in the respective bus sections (S78). As in the third embodiment, this comparison also takes account of the processing time required for the new task. If sufficient bus bandwidths cannot be secured from the initial schedule of allocation of the reserved tasks, a tentative adjustment is made in the schedule before making another comparison as in the third embodiment. In the interests of providing a simple drawing, those processes shall also be included in S78 of FIG. 18. If it is determined that the optimum bus bandwidths of the new task can be scheduled without exceeding the bus bandwidths available from the bus sections at any point in time (Y at S78, N at S88), the loading is completed (S38) and the schedule file and the bus bandwidth reservation file are updated (S40) as shown in FIG. 7. In this instance, the optimum bus bandwidth is written to the used value field 78e of the new software on the bus bandwidth reservation table 78.

On the other hand, if it is determined that the optimum bus bandwidth exceeds the available bus bandwidth (N at S78), the determination part 66 compares the priority of the new task which is read during the processing pertaining to the processing time attribute (S56 in FIG. 15) and the priorities of the reserved tasks (S58 of the same chart) (S80). If there is no low priority task (N at S80), the activation processing part 68 performs load nonpermission processing on the new software (S82). If there are any low priority tasks (Y at S80), the state acquisition part 64 refers to the bus bandwidth reservation file and extracts the low priority tasks that have used bus bandwidths greater than the minimum bus bandwidth in value (S84). If there are applicable low priority tasks (Y at S84), the used value of one of these is tentatively reduced to calculate a tentatively available bus bandwidth (S86, S76). The determination part 66 then compares the optimum bus bandwidth of the new task and the tentatively available bus bandwidth (S78). The used bus bandwidth of the low priority task can be reduced up to the minimum bus bandwidth. The reduction may be made gradually while monitoring the result of determination by the determination part 66. Gradual reductions may also be evenly made to a plurality of low priority tasks.

When the optimum bus bandwidth of the new task is guaranteed (Y at S78), the activation processing part 68 displays, on the display unit 500, a warning as to the possibility that processing operating speed of the low priority task(s) with reduced bus bandwidth may be slowed (Y at S88, S90). The activation processing part 68 then modifies the used value field(s) 78e of the corresponding piece(s) of software on the bus bandwidth reservation table 78 so as to reduce the used bus bandwidth(s) of the task(s) (S92). Then, as shown in FIG. 7, the activation processing part 68 completes loading of the new piece of software (S38), and performs update processing on the schedule file, the bus bandwidth reservation file, and the priority file. At step S90, the user may be inquired whether or not the processing operating speed of the low priority task(s) may be slowed. In this case, if the user rejects the reduction in the processing operating speed of the task(s), the loading of the new piece of software is cancelled as in S82. On the other hand, if the user accepts the reduction in the processing operating speed, the load completion processing described above is performed.

If the optimum bus bandwidth of the new task exceeds the tentatively available bus bandwidth (N at S78), and there is a low priority task that has a used bus bandwidth greater than the minimum bus bandwidth (Y at S80, Y at S84), then a comparison is made between the bus bandwidth tentatively available when the used bus bandwidth is reduced and the optimum bus bandwidth of the new task (S86, S76, and S78). The foregoing processing is repeated until the optimum bus bandwidth of the new task no longer exceeds the tentatively available bus bandwidth (Y at S78). If the used bus bandwidths of all the low priority tasks are set to their minimum bus bandwidths before that even without securing the optimum bus bandwidth of the new piece of software (N at S84), the used bus bandwidth of the new task is tentatively reduced (S94, S96) to determine whether or not the tentatively available bus bandwidth is exceeded (S78). The used bus bandwidth of the new task can also be reduced up to the second required value of the bus bandwidth attribute. Then, if the tentatively available bus bandwidth is not exceeded (Y at S78), the activation processing part 68 displays, on the display unit 500, a warning as to the possibility that the processing operating speed of the low priority task(s) with reduced bus bandwidth may be slowed and the possibility that the processing operating speed of the new task can be slowed (Y at S88, S90). The activation processing part 68 then modifies the used value field(s) 78e of the corresponding piece(s) of software on the bus bandwidth reservation table 78 so as to reduce the used bus bandwidth(s) of the low priority task(s) (S92). Then, as shown in FIG. 7, the loading of the new piece of software is completed (S38), and the update processing on the schedule file, the bus bandwidth reservation file, and the priority file is performed (S40). In this instance, the reduced first required value for the bus bandwidth attribute is written as the used bus bandwidth of the new software.

If the tentatively available bus bandwidth is exceeded even when the used bus bandwidth of the new task is reduced to the second required value (N at S78), the activation processing part 68 extracts low priority tasks on the basis of priorities or the like until the minimum bus bandwidth of the new task can be secured, and performs the same stop processing on the low priority tasks as in S68, S70, and S72 in FIG. 15 of the first embodiment (S98). Then, the load processing described above is performed on the new piece of software (S38 and S40 in FIG. 7).

By the foregoing processing, it is possible to execute all the tasks as far as possible while adjusting the used bus bandwidths of both the new task and the reserved tasks within the allowable ranges. Moreover, the user may be inquired before reducing used bus bandwidths or stopping low priority tasks. Such an embodiment allows the user to make a selection from among various measures including performing all the tasks even if the overall operation may be slowed, and stopping low priority tasks so as not to delay operation.

According to the present embodiment, as in the first to fourth embodiments, it is possible before loading new software to preclude problems unexpected by the user that could occur during the operation of the new software and in the reserved software. This allows for more efficient use of processor resources. Moreover, as in the fourth embodiment, the incorporation of the priority attribute provides an operation mode which is more flexible with respect to the processing time. Furthermore, since the priority attribute is incorporated even into the determination on bus bandwidths, it is possible to determine whether or not to permit loading depending on the priority, and adjust the bus bandwidths automatically. This provides an operation mode that is flexible not only with respect to the load permission but also with respect to the used bus bandwidths, and allows more efficient use of resources.

The present embodiment has dealt with the case where the bus bandwidth attribute is expressed in two levels, or a first required value and a second required value. Nevertheless, only a single required value may be provided while a distinction may be made as to whether the value is a strict or desirable one to follow. In this case, if tasks have strict settings of bus bandwidth to follow, their used bus bandwidths are excluded from the reduction regardless of their priorities. If tasks have desirable values of used bus bandwidth to follow, the used bus bandwidths may be reduced, for example, up to a common minimum required bus bandwidth which is set in advance. Even in this case, it is possible to obtain the same effects as in the foregoing cases.

Sixth Embodiment

The present embodiment can be practiced by the same configuration as that of the information processing apparatus 1000 shown in FIG. 1 and the management processor 32 shown in FIG. 2 of the first embodiment. Moreover, the management processor 32 performs the same procedure as in any one of the first to fifth embodiments. The following description will thus be focused primarily on the differences between the present embodiment and the first embodiment.

Figure 19:
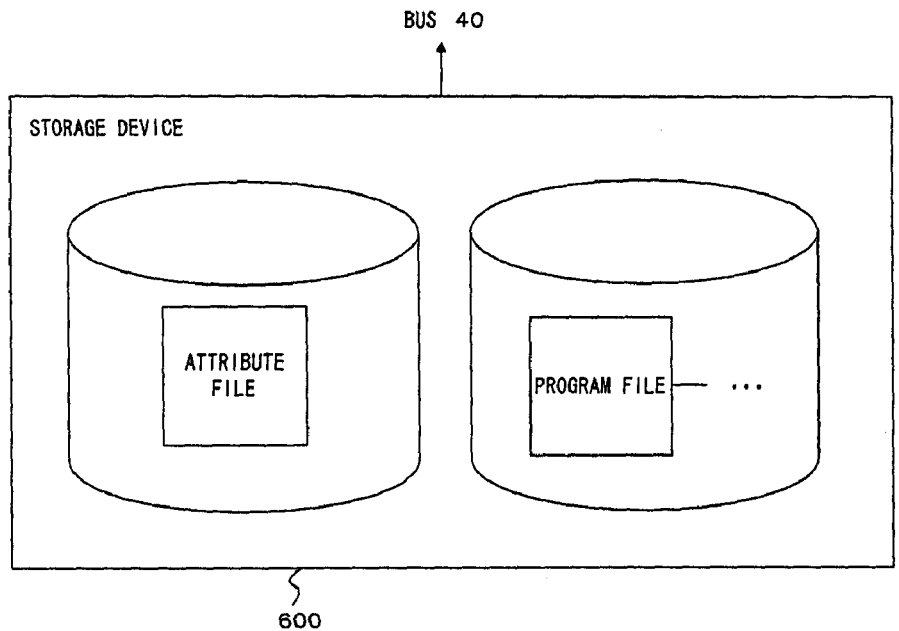
FIG. 19 is a diagram schematically showing the configuration of a storage device according to a sixth embodiment.

FIG. 19 schematically shows the configuration of storage devices 600 according to the present embodiment. The first embodiment has dealt with the case where the files that describe the processing time attribute and the bus bandwidth attribute are stored in the same storage device as the software program files are stored in, such as a CD-ROM. In the present embodiment, the attribute files are stored in a storage device 600 that is different from where the program files are stored. Aside from the processing for loading a new piece of software, the attribute acquisition part 62 initially loads an attribute file alone into the main memory 50 from the storage device 600 where the attribute files are stored. The attribute acquisition part 62 then determines whether or not to permit the loading, based on data on the processing time attribute, on the bus bandwidth attribute, and on the priority attribute included in the attribute file.

According to the present embodiment, even in such cases where the version of the OS which controls the processing operation and the like of the management processor 32 is updated and where a new model of the information processing apparatus 1000 having a higher processor operation speed or a broader bus bandwidth is manufactured, it is possible to continue using the storage device 600 that contains the program files if the storage device 600 that contains attribute files corresponding to those changes, such as a CD-ROM, is read newly. Consequently, the user can easily enjoy the synergistic effects of the same effects as those described in the first to fifth embodiments and the effects resulting from processing speeds that will be provided by the latest operating environment. Moreover, if the storage device 600 of the attribute files is a hard disk which is connected to the information processing apparatus 1000, then users can rewrite, for example, the priority attributes and the like according to their preferences. This makes it possible to perform load processing that is better suited to user needs.

Seventh Embodiment

The present embodiment can be practiced by the same configuration as that of the management processor 32 shown in FIG. 2 of the first embodiment. As shown by the overall configuration of FIG. 20, however, the information processing apparatus 1000 shown in FIG. 1 is connected to a server 700 over a network. The management processor 32 performs the same procedure as in any one of the first to fifth embodiments. The following description will thus be focused primarily on the differences between the present invention and the first and sixth embodiments.

Figure 20:
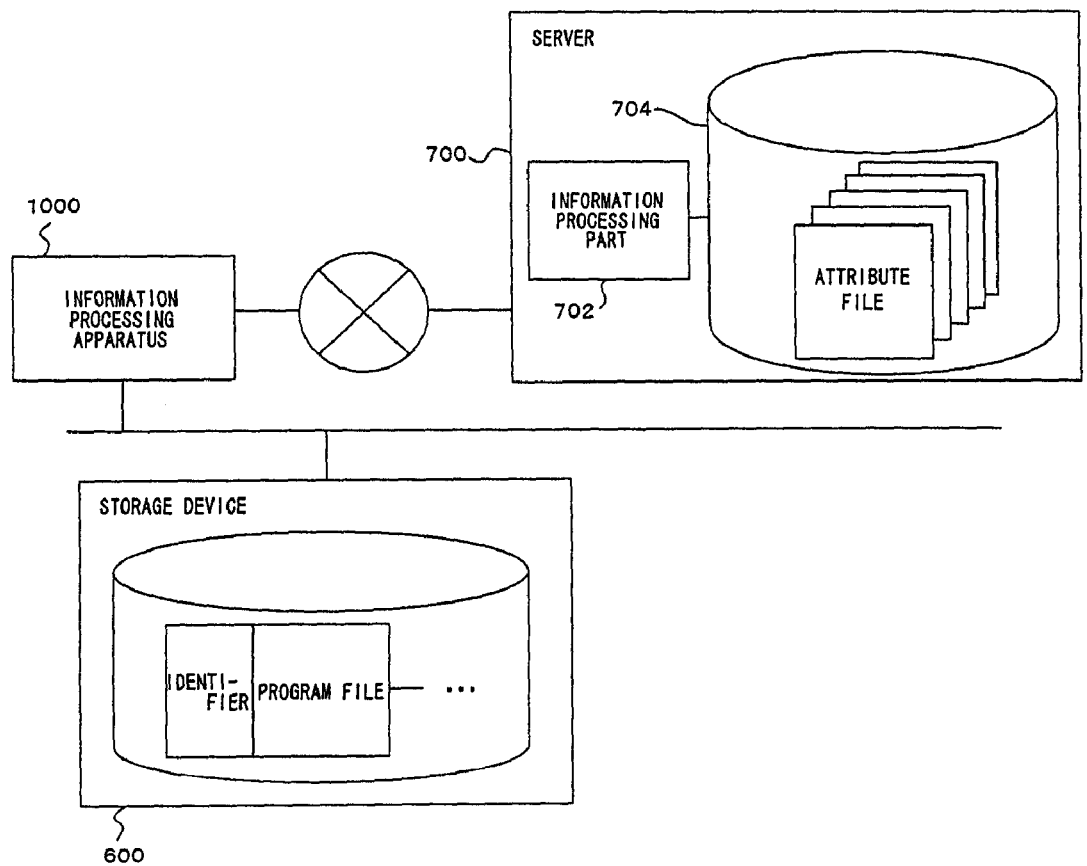
FIG. 20 is a diagram showing the overall configuration of a system according to a seventh embodiment.

FIG. 20 shows the overall configuration of the system according to the present embodiment. The first to sixth embodiments have dealt with the cases where the files that describe the processing time attribute and the bus bandwidth attribute are stored in a storage device 600, such as a CD-ROM, which is connected directly to the information processing apparatus 1000. In the present embodiment, the files are managed by the server 700. In the meantime, pieces of software are provided with identifiers for detecting attribute files corresponding to the pieces of software from the server, such as the names of the corresponding attribute files and version information of the OS.

Then, when acquiring the processing time attribute and the bus bandwidth attribute, the attribute acquisition part 62 of the information processing apparatus 1000 sends an identifier to the server 700 to make an inquiry. According to the inquiry from the information processing apparatus 1000, a server-side information processing part 702 of the server 700 detects the attribute file corresponding to that identifier from a server-side storage device 704, and notifies the information processing apparatus 1000 that it is ready for download. On receiving the notification, the attribute acquisition part 62 downloads the attribute file and stores it in the main memory 50. Subsequently, whether or not to permit the loading is determined based on the data on the processing time attribute, on the bus bandwidth attribute, and on the priority attribute included in that attribute file as in the first to fifth embodiments.

According to the present embodiment, the attribute files are managed by the server 700 all the time. Thus, even in such cases where the attribute data is improved through verification experiments on the attribute data, carried out by software makers or others, and where the version of the OS running on the information processing apparatus 1000 is updated or a new model of the information processing apparatus 1000 having a higher processor operating speed or a broader bus bandwidth is manufactured, it is possible to make operation with the latest attribute data automatically as long as the pieces of software are applicable. Consequently, a user can easily enjoy the synergistic effects of the same effects as those described in the first to fifth embodiments and the effects resulting from processing speeds that will be provided by the latest operating environment.

In the foregoing configuration, the identifiers and program files are stored in the storage device 600 that is connected to the information processing apparatus 1000. Nevertheless, they may also be stored in the server-side storage device 704 of the server 700. In this case, when the user selects a software name or the like on the display unit 500, the corresponding attribute file is downloaded first. Then, whether or not to permit the loading of the new software is determined. If it is determined to permit the loading, the information processing apparatus 1000 sends that signal to the server 700, and downloads the program file of the software. According to such a configuration, even when the user has no storage device 600 pertaining to the new software, it is possible to implement the present embodiment with the same effects as the foregoing.

Eighth Embodiment

The present embodiment can be practiced by the same configuration as that of the management processor 30 shown in FIG. 2 of the first embodiment. Nevertheless, the information processing apparatus 1000 shown in FIG. 1 is connected to the server 700 over a network as in the seventh embodiment. The management processor 32 performs the same procedure as in any one of the first to fifth embodiments. The following description will thus be focused primarily on the differences between the present embodiment and the seventh embodiment.

Figure 21:
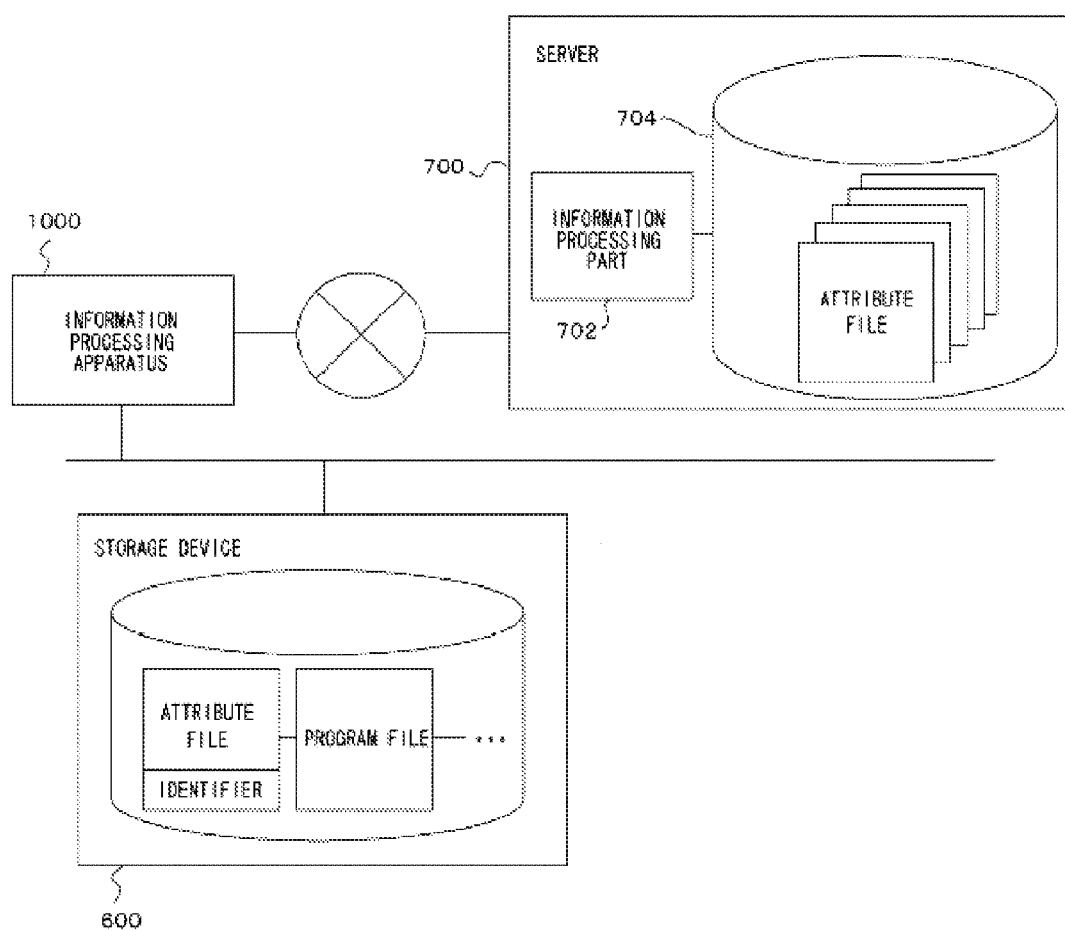
FIG. 21 is a diagram showing the overall configuration of a system according to an eighth embodiment.

FIG. 21 shows the overall configuration of the system according to the present embodiment. In the seventh embodiment, the attribute files which describe the processing time attribute and the bus bandwidth attribute are managed by the server 700 in a centralized fashion. In the present embodiment, they are also stored in the same storage device 600 as the software program files are stored in. That is, at the time of shipping of the software, the latest attribute files at that point in time are attached to the respective program files. Then, in such cases where the attribute data is improved through verification experiments on the attribute data, carried out by software makers or others, or where the version of the OS running on the information processing apparatus 1000 is updated, the attribute files are acquired from the server 700. For that purpose, pieces of software are provided with identifiers pertaining to version information on the attached attribute files and the version information of the OS at that point in time.

Then, when acquiring the processing time attribute and the bus bandwidth attribute, the attribute acquisition part 62 of the information processing apparatus 1000 initially sends the identifier to the server 700 to make an inquiry. The server-side information processing part 702 of the server 700 detects the attribute file corresponding to the identifier from the server-side storage device 704, and checks for version update. If the version is updated, it is notified to the information processing apparatus 1000, and the information processing apparatus 1000 downloads the latest attribute file from the server 700. Furthermore, if the version of the OS running on the information processing apparatus 1000 is updated, the information processing apparatus 1000 also makes an inquiry to the server 700 and downloads the attribute file corresponding to the updated version of the OS. The download procedure is the same as in the seventh embodiment. Subsequently, whether or not to permit the loading is determined based on the data on the processing time attribute, on the bus bandwidth attribute, and on the priority attribute included in the attribute file as in the first to fifth embodiments.

According to the present embodiment, the latest attribute data at the time of shipping is stored in the same storage device 600 as the software is stored in. This makes it possible to operate the information processing apparatus 1000 even without network connection. As in the seventh embodiment, it is possible to make operation with the latest operating environment which appropriately addresses such changes as an improvement of the attribute data, the version update of the OS, and a model change of the information processing apparatus 1000. This makes it possible to easily enjoy the synergistic effects of the same effects as those described in the first to fifth embodiments and the effects resulting from processing speeds that will be provided by the latest operating environment.

Up to this point, the present invention has been described in conjunction with the various embodiments thereof. The foregoing embodiments have been given solely by way of illustration. It will be understood by those skilled in the art that various modifications may be made to combinations of the foregoing components and processes, and all such modifications are also intended to fall within the scope of the present invention.

In the third and fifth embodiments, the processing pertaining to the bus bandwidth attribute is performed after the processing pertaining to the processing time attribute. Nevertheless, it may be performed before the processing pertaining to the processing time attribute. Otherwise, the processing of referring to the bus bandwidth attribute may be performed alone. Even in this case, it is possible to obtain the same effects as those of the present embodiment.

Moreover, the attributes may be written in respective different attribute files or stored in different storage devices. For example, a file that only describes the priority attribute, which is easily settable by the user, may be stored in a hard disk or the like upon first loading, followed by update and reference. For the other attributes, a file that is stored in a CD-ROM along with software program files, or a file that is stored in the server 700, may be consulted. This makes it possible to obtain the effects described in the present embodiment in a flexible and adaptive mode of operation corresponding to the properties of the attributes themselves.

As above, the present invention is applicable to electronic apparatuses which execute a plurality of tasks in parallel, such as a computer and a game console.

What is claimed is:

1. An information processing method implemented by an information processing apparatus provided with a plurality of processors, the method comprising:

scheduling the execution of a plurality of tasks among the plurality of processors in a particular order within a predetermined unit period;

executing the plurality of tasks by the plurality of processors in the particular order during the predetermined unit period, and repeating such execution over successive such predetermined unit periods;

accepting a request for execution of a new task;

identifying a specified required number of processors for the new task and a processing time required to perform the new task using the required number of processors simultaneously;

determining whether the new task is executable or not, by confirming whether the processing time and the required number of processors are available within the predetermined unit time by referring a schedule file, which indicates the schedule of reserved tasks which have been already scheduled;

making a reservation for the new task on the schedule file if the new task is determined to be executable; and processing the reserved tasks, including the new task which is determined to be executable based on the schedule file, wherein the determining step comprising, if the new task is determined to be not executable due to lack of sufficient processing time or required number of processors within the predetermined unit time, modifying tentatively at least either one of processors allocated for executing reserved tasks and the order of execution in each processor in the predetermined unit period without changing the required number of processors and the required processing time for the reserved tasks or the new task, and again determining whether the new task is executable or not, and the making a reservation step comprising, if the required processing time for the new task is available, updating the schedule file to reflect the tentatively modified schedule so as to make a reservation for the new task.

2. The information processing method according to claim 1, further comprising notifying a result of determination to a task that has issued the request for the execution of the new task if the new task is determined to be not executable in the determining of whether the new task is executable or not.

3. The information processing method according to claim 1, wherein:

the identifying further identifies a required bus bandwidth for processing the new task, and if processing time available for the new task is present simultaneously for processors with the required number, the determining determines whether the new task is executable or not by also confirming whether an implemented bus bandwidth satisfies a total required bus bandwidth during the available processing time, the total required bus bandwidth being a sum of bus bandwidths required for processing the reserved task and the new task.

4. The information processing method according to claim 3, wherein:

the determining of whether the new task is executable or not further includes referring to the priority information on the new task and priority information on the reserved task if the implemented bus bandwidth satisfies the total required bus bandwidth during the available processing time; and whether the reserved task is executable or not is determined, aside from the new task, based on the referred priority information.

5. The information processing method according to claim 4, further comprising notifying a result of determination to a system control part which controls the apparatus, if either one of the new task and the reserved task is determined to be not executable in the determining of whether the new task is executable or not.

6. The information processing method according to claim 5, further comprising notifying a user, with a user-recognizable expression, that either one of the new task and the reserved task is determined to be not executable, based on the result of determination notified to the system control part.

7. The information processing method according to claim 6, further comprising accepting an input of information from the notified user, the information pertaining to permission not to execute the task that is determined to be not executable, and wherein whether the new task and the reserved task are executable or not is determined again based on the information pertaining to permission.

8. The information processing method according to claim 3, wherein:

the determining comprising, if the implemented bus bandwidth does not satisfy the total required bus bandwidth, modifying tentatively at least either one of processors allocated for executing reserved tasks and the execution procedure in each processor, and again confirms whether the implemented bus bandwidth satisfies the total required bus bandwidth during the available processing time.

9. The information processing method according to claim 1, wherein:

the processing time required is a processing time per a period of a vertical synchronization signal of a display, which outputs images and pictures resulting from the information processing apparatus, necessary for the new task, and the modifying step includes modifying at least either one of the processors allocated and the execution order of the reserved tasks in the period of the vertical synchronization signal as the predetermined unit period.

10. An information processing apparatus comprising:

a first processor unit which is provided with a plurality of processors and executes a plurality of tasks by the plurality of processors in a particular order during a predetermined unit period, and repeating such execution over successive such predetermined unit periods;

a second-processor which primarily performs computing;

a main memory which stores information on tasks to be processed; and a data input and output processor which controls input and output of data with an external device, wherein the first processor unit includes:

an execution request accepting part which accepts a request for execution of a new task;

a parameter identification part which identifies a specified required number of processors for the new task, a processing time required to perform the new task using the required number of processors simultaneously, and a required bus bandwidth needed to process the new task;

an execution permission part which determines whether the new task is executable or not, by: (i) confirming whether the processing time and the required number of processors are available within the predetermined unit time by referring a schedule file, which indicates an execution schedule of reserved tasks which have been already scheduled, and (ii) confirming whether an implemented bus bandwidth satisfies a total required bus bandwidth during the predetermined unit time, the total required bus bandwidth being a sum of bus bandwidths required for processing the reserved task and the new task; and an activation processing part which activates processing of the new task if the new task is determined to be executable, and wherein the execution permission part modifies, when a determination is made that the new task is not executable due to lack of sufficient processing time, required number of processors, or total required bus bandwidth within the predetermined unit time, at least either one of processors allocated for executing the reserved tasks and the order of execution in each processor in the predetermined unit period without changing the required number of processors and the required processing time for the reserved tasks or the new task, so that the new task is executable, and the required bus bandwidth includes at least any one of:

a bus bandwidth required for the new task when transmitting data between the first processor unit and the main memory;

a bus bandwidth required for the new task when transmitting data between the first processor unit and second processors; and a bus bandwidth required for the new task when transmitting data between the first processor unit and the data input and output processor.

11. The information processing apparatus according to claim 10, wherein the second processor is a graphic processor, and performs an image processing operation based on acquired data pertaining to image processing under control of the first processor unit.

12. The information processing apparatus according to claim 10, wherein the execution permission part determines whether the new task is executable or not, based on priority information on the new task and priority information on the reserved task if the implemented bus bandwidth does not satisfy the total required bus bandwidth.

13. The information processing apparatus according to claim 12, wherein the execution permission part determines whether the reserved task is executable or not, aside from the new task, based on the priority information, if the implemented bus bandwidth does not satisfy the total required bus bandwidth.

14. The information processing apparatus according to claim 13, further comprising a determination result notification part which notifies a user, with a user-recognizable expression, that either one of the new task and the reserved task is determined to be not executable if the execution permission part determines that either one of the new task and the reserved task is not executable.

15. The information processing apparatus according to claim 12, wherein:

the parameter identification part further identifies an optimum bus bandwidth and a minimum bus bandwidth for processing the new task; and the execution permission part determines whether the new task is executable or not by adjusting the bus bandwidth to be used by the reserved task having a lower priority than that of the new task, within the range of not greater than the optimum bus bandwidth and not smaller than the minimum bus bandwidth.

16. The information processing apparatus according to claim 15, further comprising a bus bandwidth control part which controls the bandwidths of the bus between the first processor unit, the second processor, and the data input and output processor to be used by the new task and the reserved task, respectively, based on the result of adjustment.

17. The information processing apparatus according to claim 10, wherein the parameter identification part includes:

a parameter request issuing part which issues an information request for information on at least the required number of processors, the processing time required, and the required bus bandwidth-for processing the new task, to a server connected over a network; and a parameter reception part which receives the information that is identified by the server in response to the information request.

18. The information processing apparatus according to claim 10, further comprising:

a parameter storage part which stores information on at least the required number of processors, the processing time required, and the required bus bandwidth task by task separately from a software program of a task, and wherein the parameter identification part identifies the time-related parameter pertaining to processing the new task by searching the parameter storage part.

* * * * *